United States Patent
Kadam

(10) Patent No.: US 12,052,410 B2
(45) Date of Patent: Jul. 30, 2024

(54) IMAGE PROCESSING DEVICE, IMAGE PROCESSING METHOD, AND IMAGE DISPLAY SYSTEM FOR GENERATING COMMON IMAGES AND INDIVIDUAL IMAGES FOR USERS WITH OVERLAPPING FIELDS OF VIEW

(71) Applicant: SONY GROUP CORPORATION, Tokyo (JP)

(72) Inventor: Akshat Kadam, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/778,607

(22) PCT Filed: Oct. 6, 2020

(86) PCT No.: PCT/JP2020/037926
§ 371 (c)(1),
(2) Date: May 20, 2022

(87) PCT Pub. No.: WO2021/106379
PCT Pub. Date: Jun. 3, 2021

(65) Prior Publication Data
US 2023/0007231 A1      Jan. 5, 2023

(30) Foreign Application Priority Data
Nov. 29, 2019   (JP) .................. 2019-216706

(51) Int. Cl.
*H04N 13/368* (2018.01)
*G06V 10/22* (2022.01)
(Continued)

(52) U.S. Cl.
CPC ........... *H04N 13/368* (2018.05); *G06V 10/22* (2022.01); *G06V 10/764* (2022.01);
(Continued)

(58) Field of Classification Search
CPC ............... H04N 13/368; H04N 13/111; H04N 13/341; H04N 13/398; H04N 2213/008;
(Continued)

(56) References Cited

U.S. PATENT DOCUMENTS

| 10,789,912 B2 * | 9/2020 | Anderson ............... G09G 5/003 |
| 10,855,965 B1 * | 12/2020 | Jiao ...................... H04N 13/383 |
| 2017/0358140 A1 | 12/2017 | Kohler et al. |
| 2018/0253884 A1 * | 9/2018 | Burnett, III .......... H04N 13/398 |
| 2018/0300098 A1 | 10/2018 | Vembar et al. |

(Continued)

FOREIGN PATENT DOCUMENTS

| JP | 2001-320652 A | 11/2001 |
| JP | 2004-113586 A | 4/2004 |
| JP | 2008244753 A | 10/2008 |
| JP | 2010-512058 A | 4/2010 |

(Continued)

*Primary Examiner* — Said Broome
*Assistant Examiner* — Donna J. Ricks
(74) *Attorney, Agent, or Firm* — Paratus Law Group, PLLC

(57) ABSTRACT

There is provided an image processing device that processes a projection image presented to a plurality of persons at the same time. The image processing device specifies an overlapping area in which fields of view of two or more users overlap based on information on each user, classifies objects included in the overlapping area into a first object group and a second object group, generates a common image common to all users, made up of the first object group, generates individual images different for each user, made up of the second object group, and determines an output protocol for displaying the individual images.

12 Claims, 31 Drawing Sheets

(51) Int. Cl.
  *G06V 10/764*    (2022.01)
  *H04N 13/111*    (2018.01)
  *H04N 13/341*    (2018.01)
  *H04N 13/398*    (2018.01)

(52) U.S. Cl.
  CPC ......... *H04N 13/111* (2018.05); *H04N 13/341* (2018.05); *H04N 13/398* (2018.05); *H04N 2213/008* (2013.01)

(58) Field of Classification Search
  CPC ...... H04N 5/74; H04N 13/361; H04N 13/363; H04N 13/366; G09G 5/00; G09G 5/36; G06V 10/22; G06V 10/764; G06V 40/10; G06V 10/26
  See application file for complete search history.

(56) References Cited

U.S. PATENT DOCUMENTS

| | | | |
|---|---|---|---|
| 2020/0195911 A1* | 6/2020 | Haseltine | H04N 13/305 |
| 2020/0267379 A1* | 8/2020 | Woods | H04N 13/376 |
| 2020/0371378 A1* | 11/2020 | Makinen | G02B 30/50 |

FOREIGN PATENT DOCUMENTS

| | | | |
|---|---|---|---|
| JP | 2011-071757 A | 4/2011 |
| JP | 2011197537 A | 10/2011 |
| JP | 2012027641 A | 2/2012 |
| JP | 2012129701 A | 7/2012 |
| JP | 2019047159 A | 3/2019 |
| JP | 2019-184734 A | 10/2019 |
| WO | WO 2019/220729 A1 | 11/2019 |

* cited by examiner

IMAGE PROCESSING DEVICE, IMAGE PROCESSING METHOD, AND IMAGE DISPLAY SYSTEM FOR GENERATING COMMON IMAGES AND INDIVIDUAL IMAGES FOR USERS WITH OVERLAPPING FIELDS OF VIEW

CROSS REFERENCE TO PRIOR APPLICATION

This application is a National Stage Patent Application of PCT International Patent Application No. PCT/JP2020/037926 (filed on Oct. 6, 2020) under 35 U.S.C. § 371, which claims priority to Japanese Patent Application No. 2019-216706 (filed on Nov. 29, 2019), which are all hereby incorporated by reference in their entirety.

TECHNICAL FIELD

The technologies disclosed in the present specification (hereinafter referred to as "the present disclosure") relate to an image processing device and an image processing method for processing a projection image, and an image display system.

BACKGROUND ART

Projection technology for projecting images on screens has been known for a long time and is widely used in an educational field, conferences, and presentations. Since an image can be enlarged and displayed on a relatively large screen, there is an advantage that the same image can be presented to a plurality of persons at the same time. Recently, a projection mapping technology for projecting and displaying an image on the surface of a screen having an arbitrary shape such as a building has been frequently used. The projection mapping technology is realized, for example, by measuring a three-dimensional shape of a projection surface and projecting a distortion-free image by correcting the projection image according to the measurement result (see, for example, PTL 1).

CITATION LIST

Patent Literature

[PTL 1]
JP 2001-320652 A
[PTL 2]
JP 2019-184734 A
[PTL 3]
JP 2011-71757 A

SUMMARY

Technical Problem

An object of the technology according to the present disclosure is to provide an image processing device and an image processing method for processing an image projected on a screen having an arbitrary shape, and an image display system.

Solution to Problem

A first aspect of the technology according to the present disclosure provides an image processing device that executes processing on content to be displayed to a plurality of users, the device including: a user information acquisition unit that acquires information on each user; a classification unit that specifies an overlapping area in which fields of view of two or more users overlap based on the information on each user and classifies objects included in the overlapping area into a first object group and a second object group; a generation unit that generates a common image common to all users, made up of the first object group and generates individual images different for each user, made up of the second object group; and a determination unit that determines an output protocol for displaying the individual images.

The classification unit classifies the objects included in the overlapping area into the first object group present in a background and the second object group which is a foreground for at least some users, and the generation unit generates a background image including the first object group as a common image and generates a foreground image for each user including the second object group as the individual image. For example, the generation unit generates an individual foreground image in which each object included in the second object group has an effect of motion parallax for each user. Alternatively, the generation unit generates an individual image including an object assigned to each user in the second object group.

The determination unit determines an output protocol related to a timing for outputting the individual images in a time-division manner. The image processing device according to the first aspect further includes a communication unit for notifying a device such as shutter glasses used by each user of the output protocol.

A second aspect of the technology according to the present disclosure provides an image processing method of executing processing on content to be displayed to a plurality of users, the method including: a user information acquisition step of acquiring information on each user; a classification step of specifying an overlapping area in which fields of view of two or more users overlap based on the information on each user and classifying objects included in the overlapping area into a first object group and a second object group; a generation step of generating a common image common to all users, made up of the first object group and generating individual images different for each user, made up of the second object group; and a determination step of determining an output protocol for displaying the individual images.

A third aspect of the technology according to the present disclosure provides an image display system including: an image processing device that specifies an overlapping area in which fields of view of two or more users overlap based on information on each user, classifies objects included in the overlapping area into a first object group and a second object group, generates a common image common to all users, made up of the first object group, generates individual images different for each user, made up of the second object group, and notifies shutter glasses used by each user of an output protocol for displaying the individual images; a first display device that outputs the common image; a second display device that outputs the individual images of each user; and the shutter glasses used by each user.

Advantageous Effects of Invention

According to the technology according to the present disclosure, it is possible to provide an image processing device and an image processing method for processing a projection image presented to a plurality of persons at the same time, and an image display system.

Note that the effects described in the present specification are merely examples, and the effects provided by the technology according to the present disclosure are not limited thereto. In addition, the technology according to the present disclosure may further provide additional effects in addition to the aforementioned effects.

Other objects, features, and advantages of the technology of the present disclosure will become clear according to detailed description based on embodiments which will be described later and the attached drawings.

DESCRIPTION OF EMBODIMENTS

Hereinafter, embodiments of the technology according to the present disclosure will be described in detail with reference to the drawings.

First Embodiment

Figure 1:
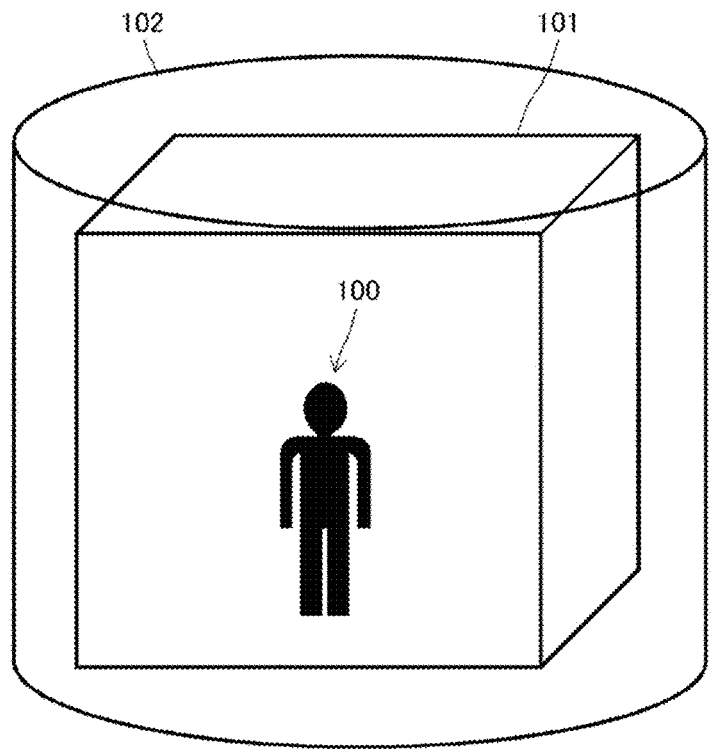
FIG. 1 is a diagram showing an operation example of projection mapping (a perspective view from above).
Figure 2:
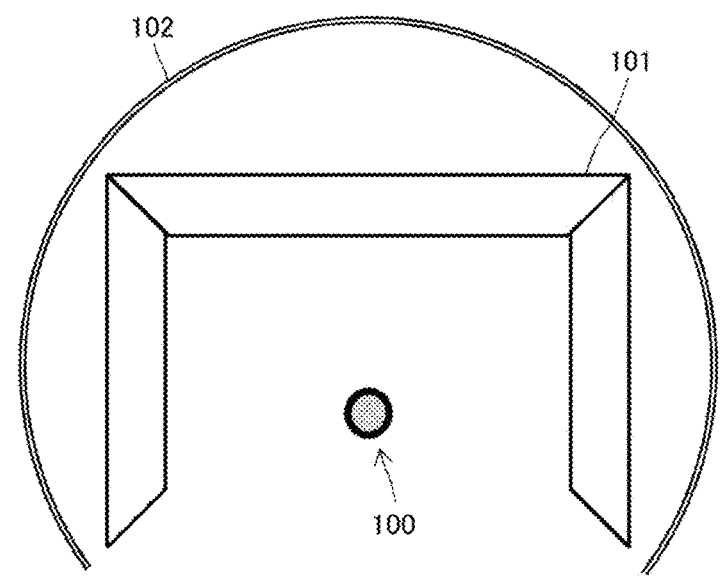
FIG. 2 is a diagram showing an operation example of projection mapping (a top view from above).

FIGS. 1 and 2 schematically show an operation example of projection mapping. In the shown example, a user 100 experiencing a virtual reality (VR) space provided by projection mapping technology stands in a rectangular room 101. The wall surface on all sides of the room 101 is the real environment. Further, a rectangular virtual screen 102 on which a VR image to be presented to the user 100 is drawn is arranged on the outer side of the room 101. However, FIG. 1 shows a perspective view showing the real environment and the virtual environment viewed from above, and FIG. 2 shows a top view showing the real environment and the virtual environment viewed from above.

When a VR image on the virtual screen 102 is presented to the user by projection mapping using the wall surface of the room 101, the three-dimensional shape of the wall surface of the room 101 is measured by a camera or a distance sensor (not shown), and a distortion-free VR image is projected on the wall surface of the room 101 by correcting the projection image according to the measurement result. Conventionally, an image projected by a projection mapping technology is basically an image displayed only from a specific viewpoint (for example, a viewpoint at the time of creation). Therefore, even if the user 100 moves in the room 101 under the operating environment as shown in FIGS. 1 and 2, the image projected on the wall surface does not move, so that the user 100 cannot be completely immersed in the virtual world. Therefore, there is a need for a mechanism for tracking the position, posture, and line of sight of the user 100 and feeding back the tracking information so that the VR image follows the user 100.

Figure 3:
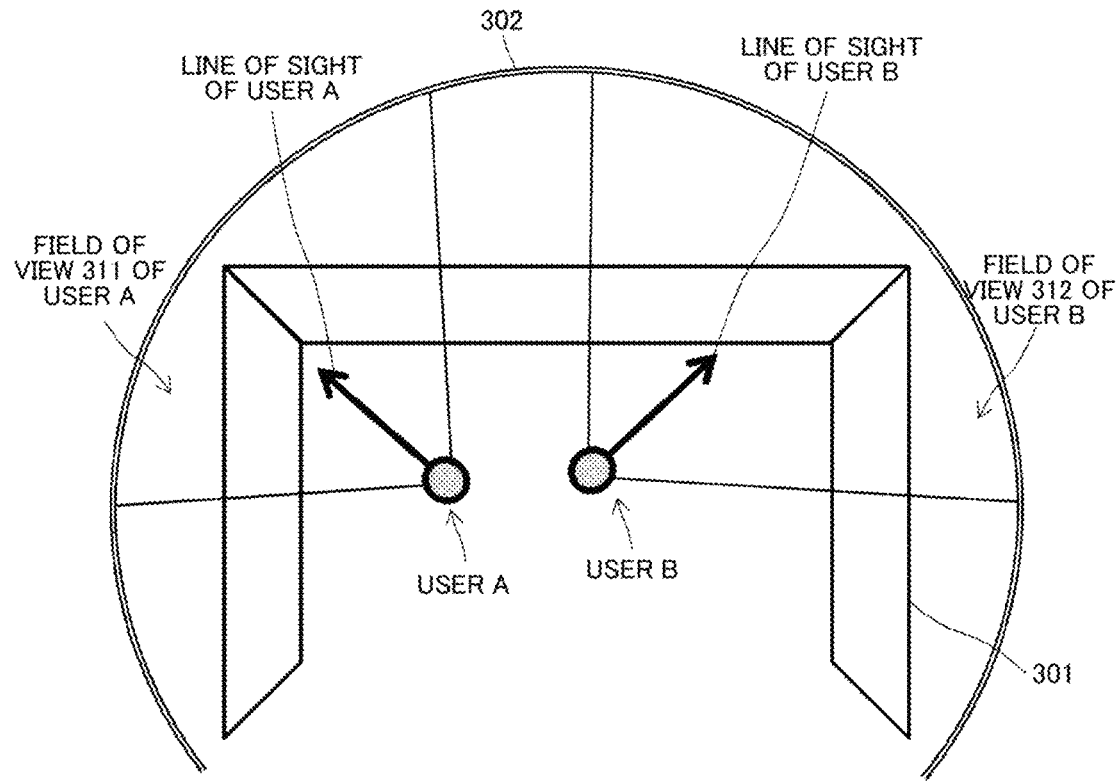
FIG. 3 is a diagram showing an operation example in which a plurality of users experience projection mapping at the same time.

FIG. 3 schematically shows an operation example in which a plurality of users experience projection mapping at the same time. However, the figure shows the real environment and the virtual environment viewed from above. For the sake of simplification, in FIG. 3, there are two users, users A and B.

Here, it is assumed that a VR image that follows the movement of each user is presented. Therefore, the positions, postures, and lines of sight of users A and B are tracked. Then, as the VR image on the virtual screen 302, two types of images are generated including the VR image (View for User A) viewed from the position, posture, and line of sight of user A, and the VR image (View for User B) viewed from the position, posture, and line of sight of user B. The VR image for user A on the virtual screen 302 is projected on the area of the field of view (FoV limit) of user A, of the wall surface of the room 301 by projection mapping. The VR image for user B on the virtual screen 302 is projected on the area of the field of view (FoV limit) of user B, of the wall surface of the room 301 by projection mapping.

Figure 4:
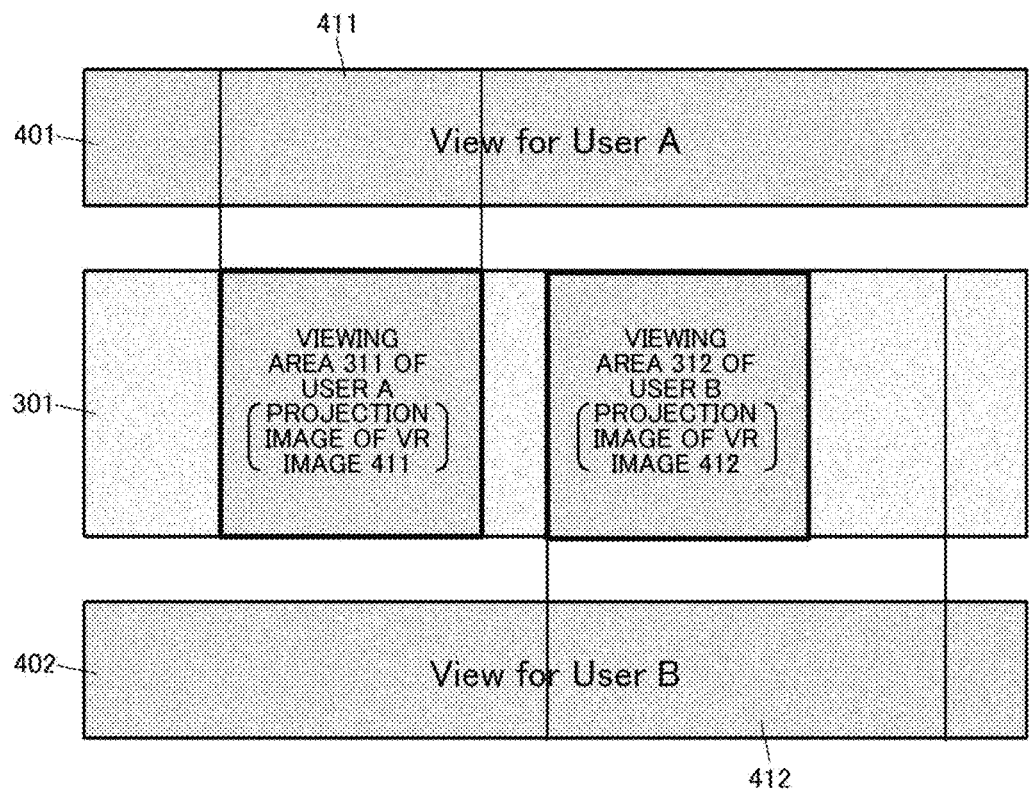
FIG. 4 is a diagram showing a mechanism for mapping VR images for users A and B on the wall surface of a room 301.

FIG. 4 illustrates a mechanism for mapping VR images for users A and B on the wall surface of the room 301. The positions, postures, and lines of sight of users A and B in the room 301 are tracked based on sensor information from a camera, a distance sensor, or other sensors (not shown).

Then, as the VR image on the virtual screen 302, two types of images are generated including a VR image (View for User A) 401 viewed from the position, posture, and line of sight of user A, and a VR image (View for User B) 402 viewed from the position, posture, and line of sight of user B. Both the VR image 401 and the VR image 402 are images mapped to the same virtual world coordinate system, but in reality, they are written to, for example, individual plane memories for each user.

Next, an image 411 of the viewing area of user A is cut out from one VR image 401, a three-dimensional shape of a viewing area 311 of user A, of the wall surface of the room 301 is measured, and the original VR image 411 is corrected according to the measurement result, whereby a distortion-free VR image is projected on the viewing area 311 of user A on the wall surface of the room 301. Similarly, an image 412 of the viewing area of user B is cut out from the other VR image 402, a three-dimensional shape of a viewing area 312 of user B, of the wall surface of the room 301 is measured, and the original VR image 412 is corrected according to the measurement result, whereby a distortion-free VR image is projected on the viewing area 312 of user B on the wall surface of the room 301.

On the wall surface of the room 301, one image including the VR image 401 for user A mapped to the viewing area 311 of user A and the VR image 402 for user B mapped to the viewing area 312 of user B is generated and projected using projection mapping technology. Two or more projectors are used to project an image over a wide area of the wall surface of the room 301. The VR image 401 for user A and the VR image 402 for user B may both be generated from the same content or may be generated from different contents.

FIGS. 3 and 4 show a display example of a VR image when one real environment is shared by two users, but the same processing is performed when one real environment is shared by three or more users.

In FIGS. 3 and 4, for the sake of simplicity, an example in which the fields of view do not overlap among a plurality of users who share one real environment has been described. However, it is also assumed that the fields of view overlap among a plurality of users who share one real environment. When a VR image directed to another user is reflected in the field of view of one user, there is a problem that the VR experience of the user is disturbed.

Figure 5:
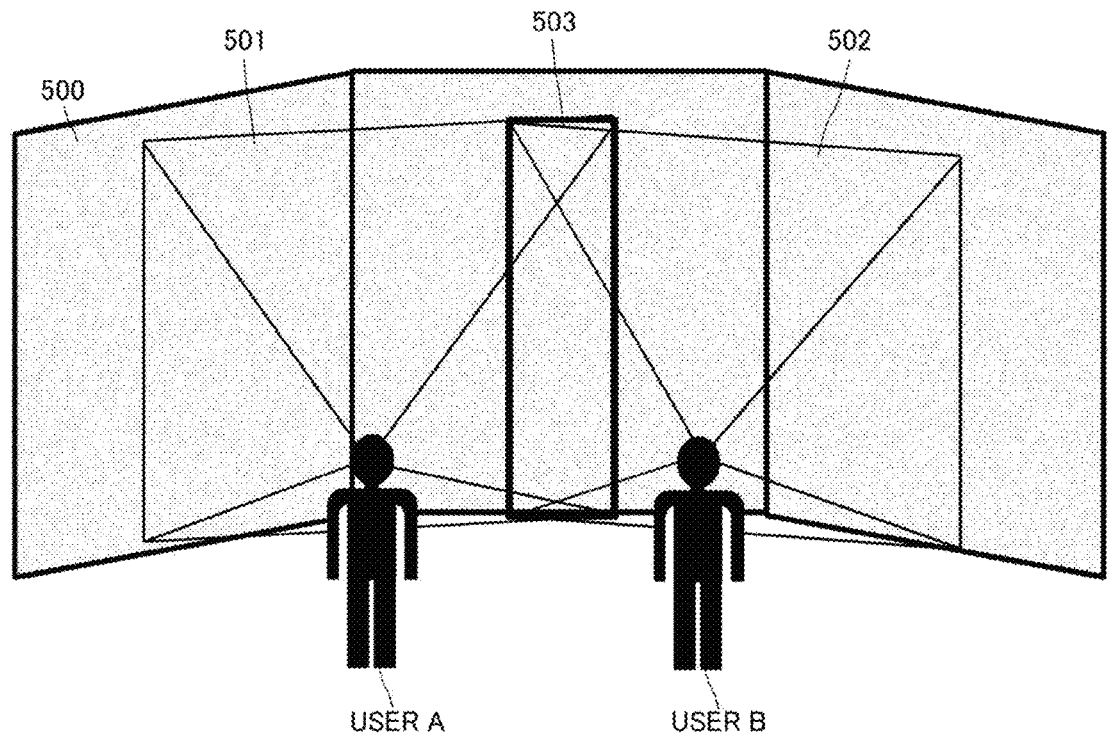
FIG. 5 is a diagram showing a state in which an overlapping area 503 is present between the view ranges 501 and 502 of users A and B who share a real environment.

FIG. 5 shows a state in which an overlapping area 503 is present between the view ranges 501 and 502 of users A and B who share the real environment made up of the wall surface 500 of a room. A VR image for user A is generated from the position, posture, and line of sight of user A with respect to the wall surface of the room 500, and is projected on the view range 501 of the wall surface 500 using the projection mapping technology. Further, a VR image for user B is generated from the position, posture, and line of sight of user B with respect to the wall surface of the room 500, and is projected on the field of view range 502 of the wall surface 500 using the projection mapping technology. Then, since the VR image directed to user B is reflected in the overlapping area 503 of the view range 501 of user A, the VR experience of user A is disturbed. Similarly, since the VR image directed to user A is reflected in the overlapping area 503 of the view range 502 of user B, the VR experience of user B is also disturbed.

Therefore, in the technology according to the present disclosure, it is precisely detected whether or not there is an overlapping area between the views of a plurality of users, and if the overlapping area is detected, the individual VR images directed to respective users are allocated to the overlapping area in a time-division manner so as to create an image suitable for each user. Each user observes the real environment by wearing shutter glasses (see, for example, PTL 3) that open and close in synchronization with switching to a VR image for himself/herself in the overlapping area. As a result, each user can view only the VR image for himself/herself, and the VR experience is not disturbed by the VR image directed to other users. On the other hand, when the overlapping area is not detected between the fields of view of users, one image including all the VR images for respective users is generated and projected on the real environment using the projection mapping technology.

Figure 6:
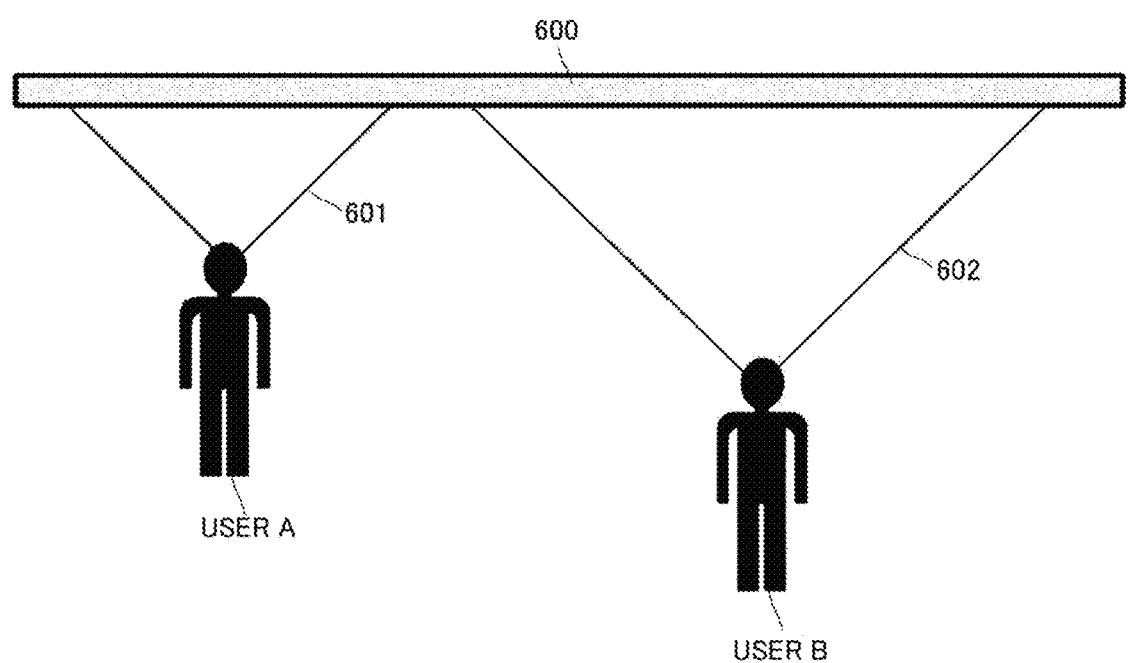
FIG. 6 is a diagram showing a mechanism for detecting an overlapping area between the views of users who share a real environment.

In the real environment shared by a plurality of users, it is necessary to precisely detect the overlapping area between the fields of view of users in order for each user to have perfect VR experience. A method of detecting the overlapping area between the fields of views of users will be described with reference to FIG. 6. However, in FIG. 6, for the sake of simplification of the explanation, the real environment is a flat wall surface 600, which is shared by two users A and B.

First, information on the positions, postures, and lines of sight of users A and B is acquired for each frame to estimate the view ranges (dynamic fields of view) of the respective users.

Next, a projection range 601 of the VR image for user A is set according to the human view limit and the distance from user A to the wall surface 600 which is the projection surface. Similarly, a projection range 602 of the VR image for user B is set according to the human view limit and the distance from user B to the wall surface 600 which is the projection surface.

In this way, when the projection ranges 601 and 602 on the wall surface 600 with respect to the dynamic fields of view of users A and B are obtained, it is possible to precisely detect whether or not the fields of view of users A and B overlap. In the example shown in FIG. 6, it is assumed that the projection range 601 of user A and the projection range 602 of user B do not overlap.

Figure 7:
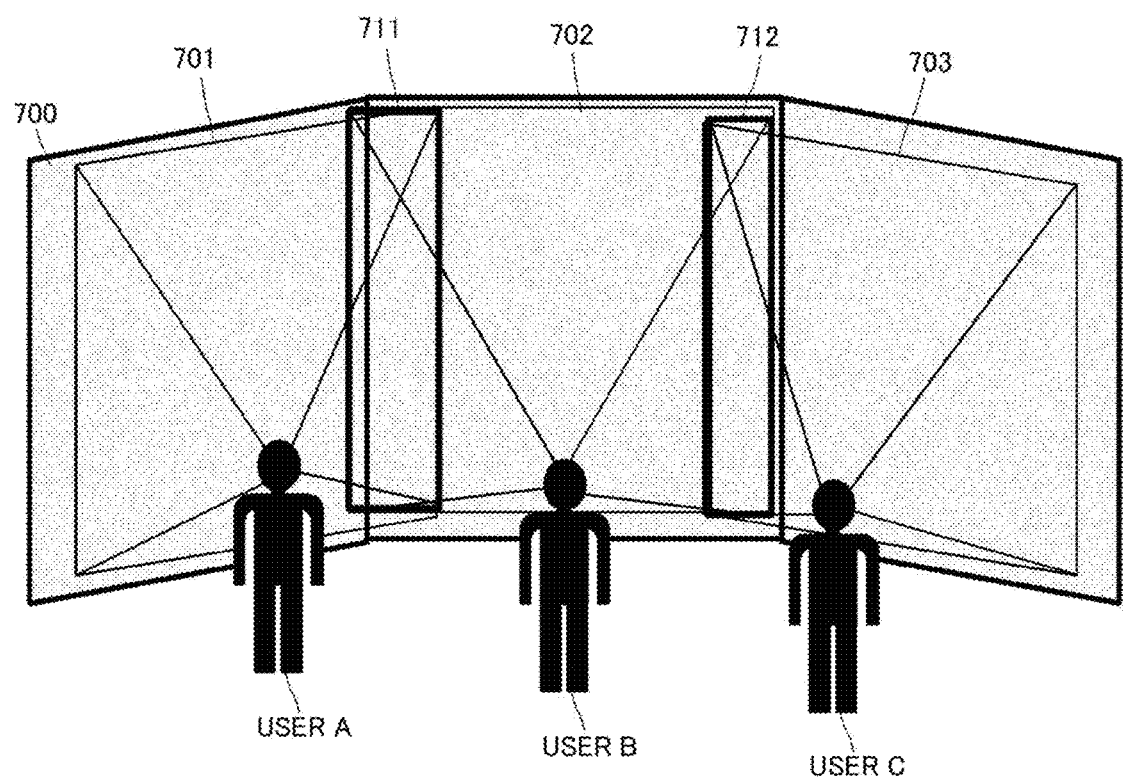
FIG. 7 is a diagram showing a state in which three users share the same real environment.

FIG. 7 shows a state in which three users A, B, and C share the same real environment. In the figure, the real environment is made up of a wall surface 700 of a room on which a VR image is projected. Then, the VR images directed to users A, B, and C are projected on projection ranges 701, 702, and 703 set individually for the users by the projection mapping technology. Here, it is assumed that an overlapping area 711 is detected between the projection range 701 of the VR image for user A and the projection range 702 of the VR image for the adjacent user B, and an overlapping area 712 is detected between the projection range 702 of the VR image for user B and the projection range 703 of the VR image for the adjacent user C.

As described above, in the technology according to the present disclosure, when an overlapping area is detected between the fields of view of a plurality of users, individual VR images directed to respective users are allocated to the overlapping area in a time-division manner to create an image suitable for each user.

Figure 8:
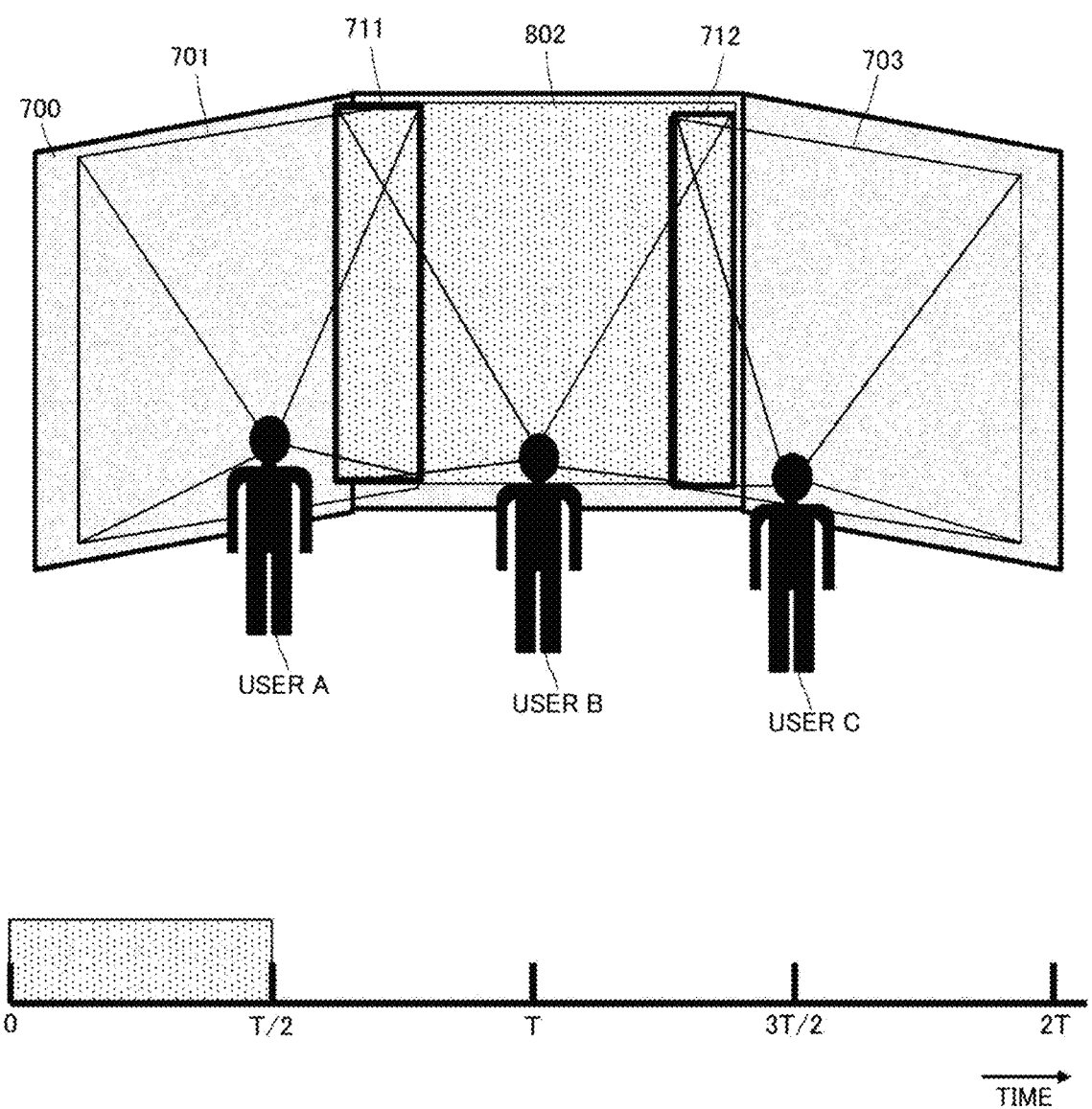
FIG. 8 is a diagram showing an operation example of projection mapping when three users share the same real environment.
Figure 9:
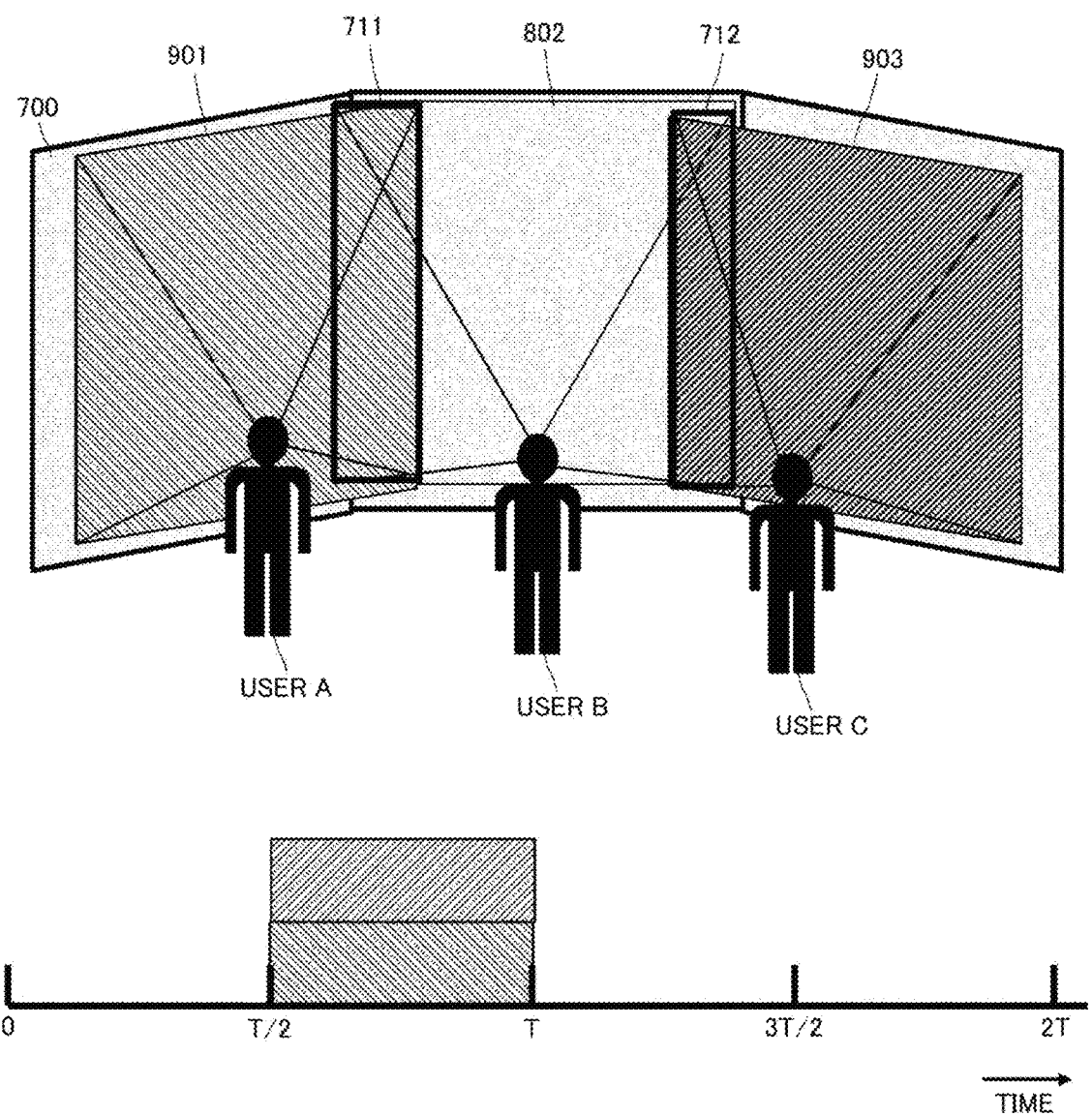
FIG. 9 is a diagram showing an operation example of projection mapping when three users share the same real environment.

FIGS. 8 and 9 show an operation example of projecting individual VR images directed to users A, B, and C in a time-division manner under the real environment shown in FIG. 7. Here, the frame period is T [milliseconds]. The frame period T is the reciprocal of the frame rate. The frame period T is divided into two segments, and an image to be projected on the wall surface 700 is sequentially switched between a segment of 0 to T/2 and a segment of T/2 to T for each frame period.

First, in the segment of 0 to T/2 in the first half of the frame period T, as shown in FIG. 8, a VR image 802 for user B is projected on the projection range 702 of user B set based on the position, posture, and line of sight of user B. User B observes the wall surface 700 in the line-of-sight direction by wearing shutter glasses that open in synchronization with the segment of 0 to T/2, whereby user B can view only the VR image for user B, and the VR experience will not be disturbed by the VR images displayed for other users.

Subsequently, in the segment of T/2 to T in the latter half of the frame period T, as shown in FIG. 9, the VR image 901 for user A is projected on the projection range 701 set for user A, and the VR image 903 for user C is projected on the projection range 703 set for user C. Users A and C observe the wall surface 700 in the line-of-sight direction by wearing shutter glasses that open in synchronization with the segment of T/2 to T, whereby users A and C can view only the VR images for users A and C, respectively, and the VR experience will not be disturbed by the VR images directed to other users.

Figure 10:
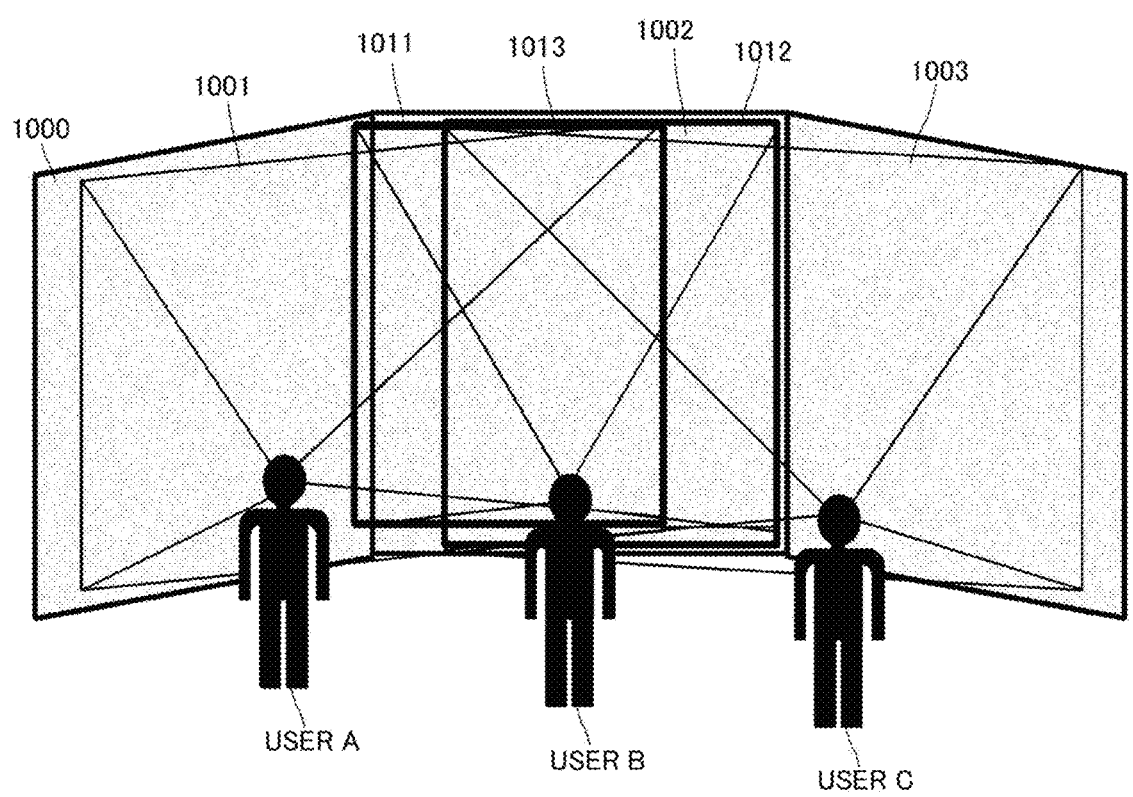
FIG. 10 is a diagram showing a state in which three users share the same real environment.

FIG. 10 shows another example in which three users A, B, and C share the same real environment. In the example shown in FIGS. 7 to 9, there is no overlapping area between the projection range 701 of the VR image for user A and the projection range 703 of the VR image for user C. On the other hand, in the example shown in FIG. 10, overlapping areas 1011 and 1012 are detected between a projection range 1001 of user A and a projection range 1002 of user B and between the projection range 1002 of user B and a projection range 1003 of user C, and an overlapping area 1013 is also detected between the projection range 1001 of user A and the projection range 1003 of user C.

Figure 11:
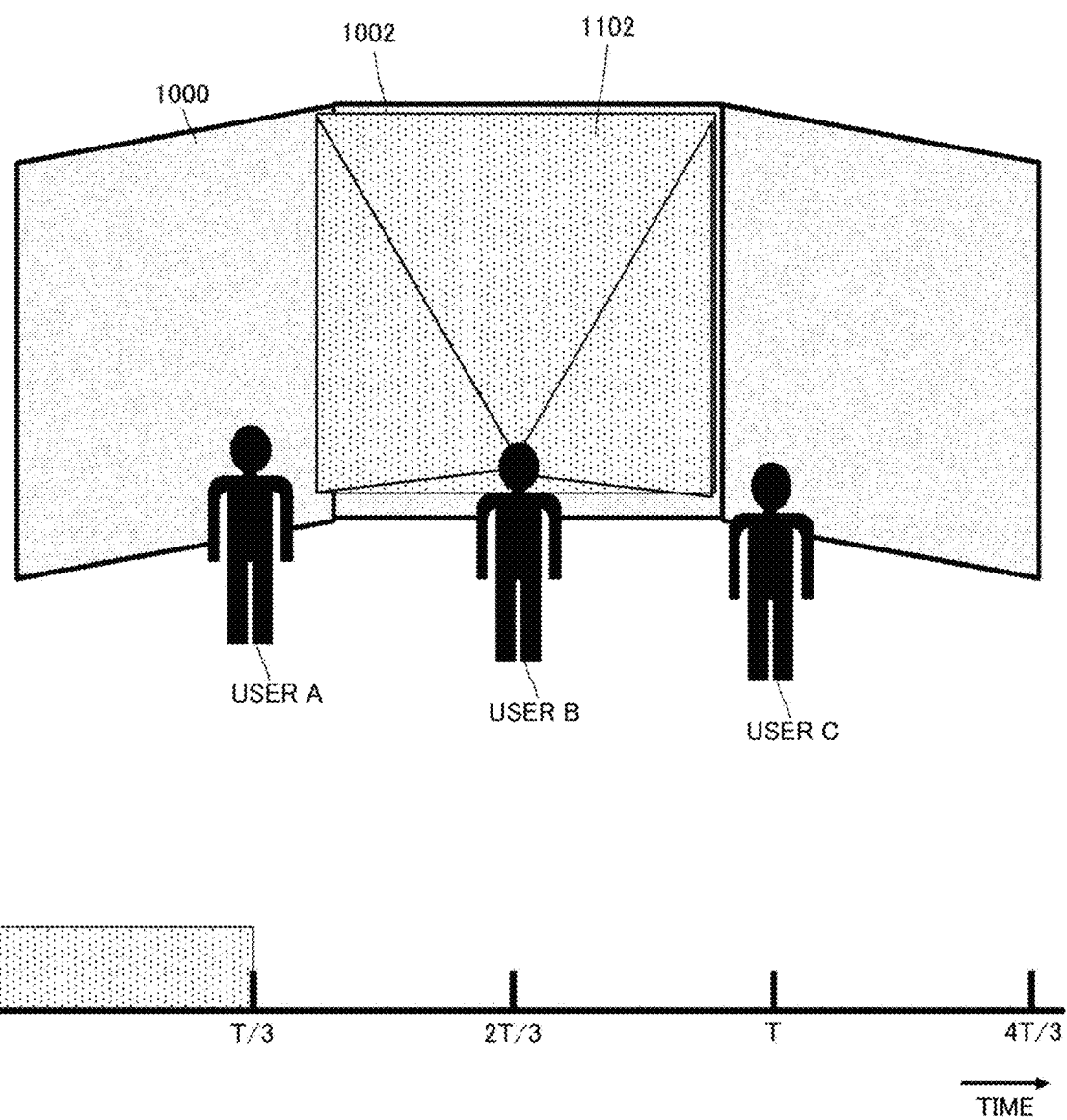
FIG. 11 is a diagram showing an operation example of projection mapping when three users share the same real environment.
Figure 12:
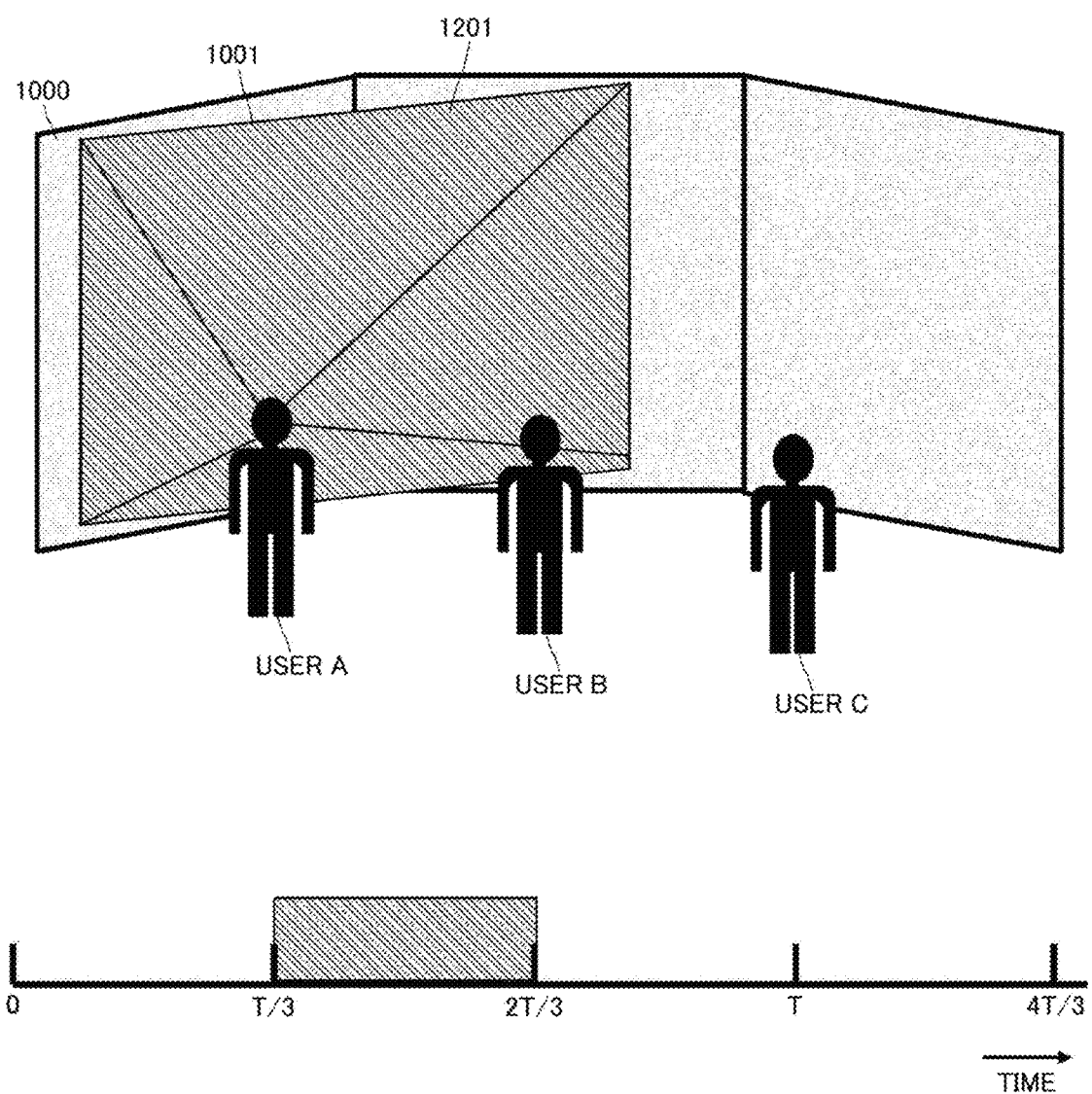
FIG. 12 is a diagram showing an operation example of projection mapping when three users share the same real environment.
Figure 13:
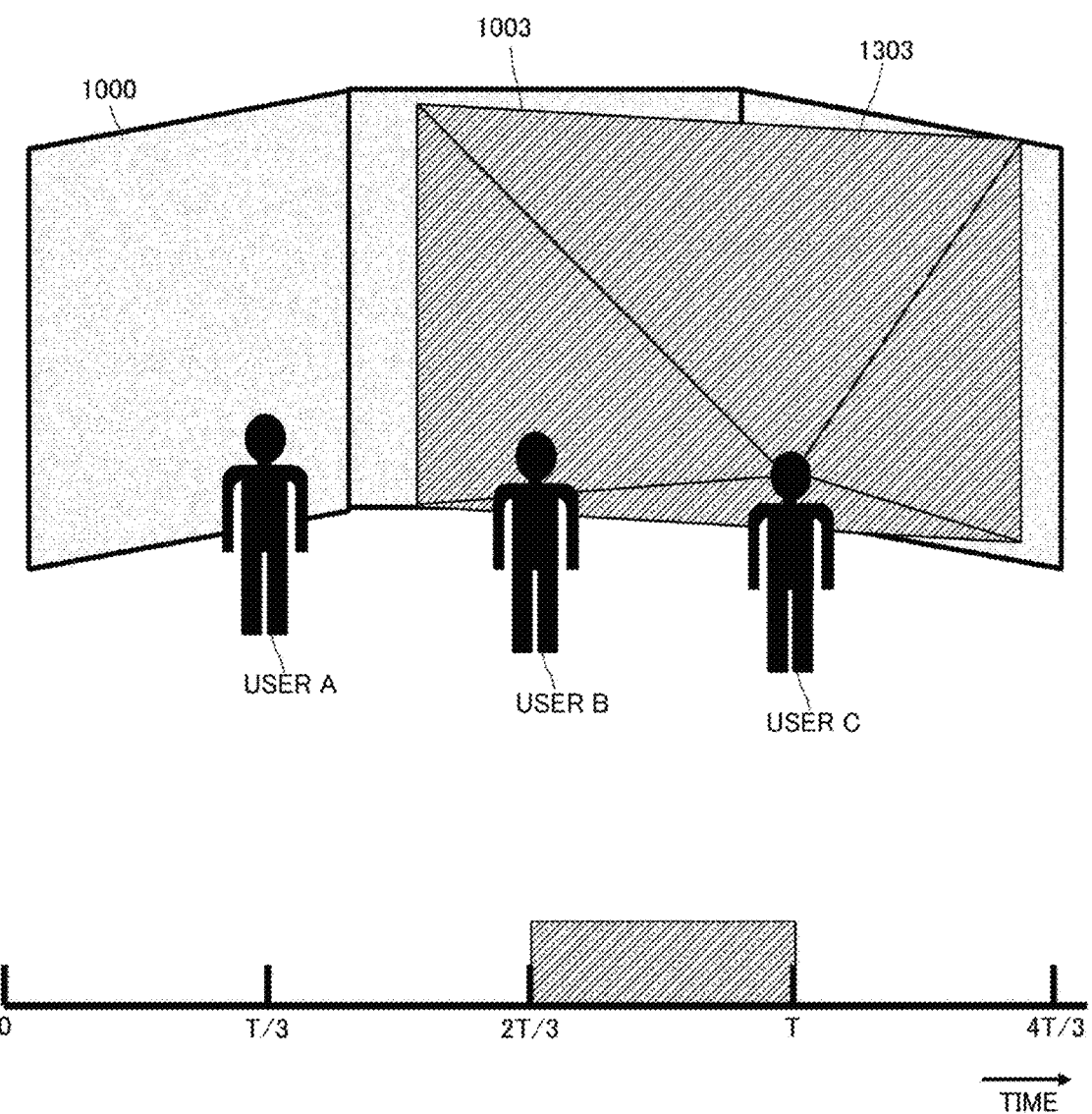
FIG. 13 is a diagram showing an operation example of projection mapping when three users share the same real environment.

FIGS. 11 to 13 show an operation example of projecting individual VR images directed to users A, B, and C in a time-division manner under the real environment shown in FIG. 10. In this case, the frame period T is divided into three segments, and an image to be projected on a wall surface 1000 is sequentially switched between a segment of 0 to T/3, a segment of T/3 to 2 T/3, and a segment of 2 T/3 to T for each frame period.

First, in the first segment of 0 to T/3 of the frame period T, as shown in FIG. 11, a VR image 1102 for user B is projected on a projection range 1002 of user B set based on the position, posture, and line of sight of user B. User B observes the wall surface 1000 in the line-of-sight direction by wearing shutter glasses that open in synchronization with the segment of 0 to T/3, whereby user B can view only the VR image for user B, and the VR experience of user B will not be disturbed by the VR images directed to users A and C.

In the subsequent segment of T/3 to 2 T/3, as shown in FIG. 12, a VR image 1201 for user A is projected on the projection range 1001 of user A set based on the position, posture, and line of sight of user A. User A observes the wall surface 1000 in the line-of-sight direction by wearing shutter glasses that open in synchronization with the segment of T/3 to 2 T/3, whereby user A can view only the VR image for user A, and the VR experience of user A will not be disturbed by the VR images directed to users B and C.

In the subsequent segment of 2 T/3 to T, as shown in FIG. 13, a VR image 1303 for user C is projected on a projection range 1003 of user C set based on the position, posture, and line of sight of user C. User C observes the wall surface 1000 in the line-of-sight direction by wearing shutter glasses that open in synchronization with the segment of 2 T/3 to T, whereby user C can view only the VR image for user C, and the VR experience of user C will not be disturbed by the VR images directed to users A and B.

Note that, if the number of users whose fields of view overlap among the users who share the same real environment increases, the number of divided frame segments increases, the time during which each user can observe the VR image in the frame segment becomes shorter, and the brightness increases.

Second Embodiment

Projector stacking is known in which images are superimposed and projected on the same projection surface using a plurality of projectors (see, for example, PTL 2). For example, the brightness of the projection image can be improved by projecting the same image in a superimposed manner.

In the technology according to the present disclosure, an original content of a projection image is separated into the foreground and the background, and the foreground and the background are projected using separate projectors, thereby maintaining the effect of motion parallax and allowing the user to have more perfect VR experience.

Motion parallax is the parallax caused by the relative movement between an observer and an observed object, and the closer the observed object is, the faster it moves, and the farther the observed object is, the slower it moves. Therefore, a virtual environment is separated into the background and the foreground, the information on the position, posture, and line of sight of the user is acquired for each frame to generate the optimum foreground image and background image, and projector stacking is performed in a real environment using two projectors. In this way, it is possible to maintain the effect of motion parallax and allow the user to have more perfect VR experience.

It is assumed that projector stacking is performed in a real environment shared by a plurality of users. Since the position, posture, and line of sight of each user with respect to the projection surface are different, the motion parallax is different for each user. When projector stacking is performed, if an image having the effect of motion parallax is projected so as to be suitable for a certain user, there is a problem that the motion parallax becomes unnatural for other users and the VR experience is disturbed.

Figure 14:
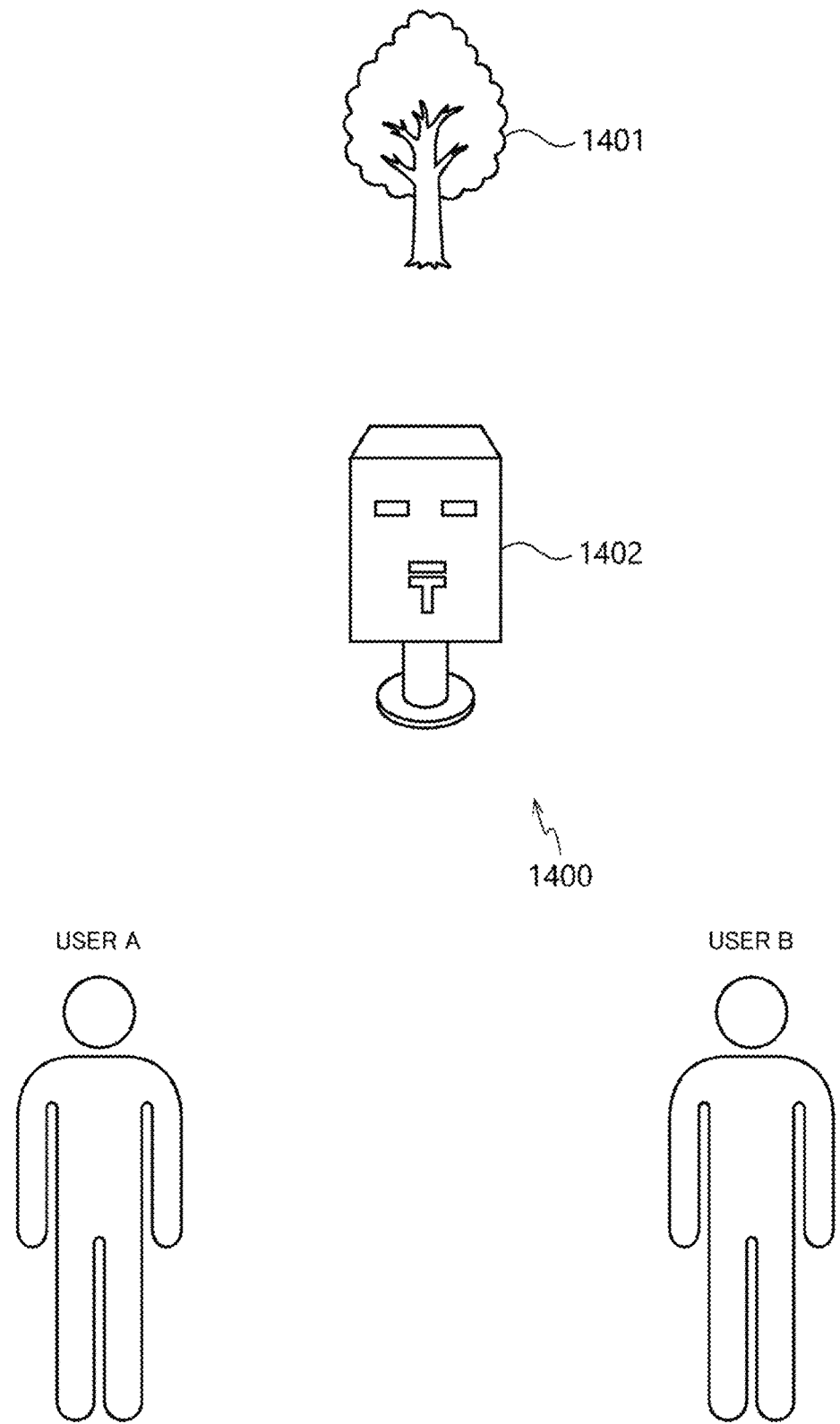
FIG. 14 is a diagram illustrating an assumed virtual environment.
Figure 15:
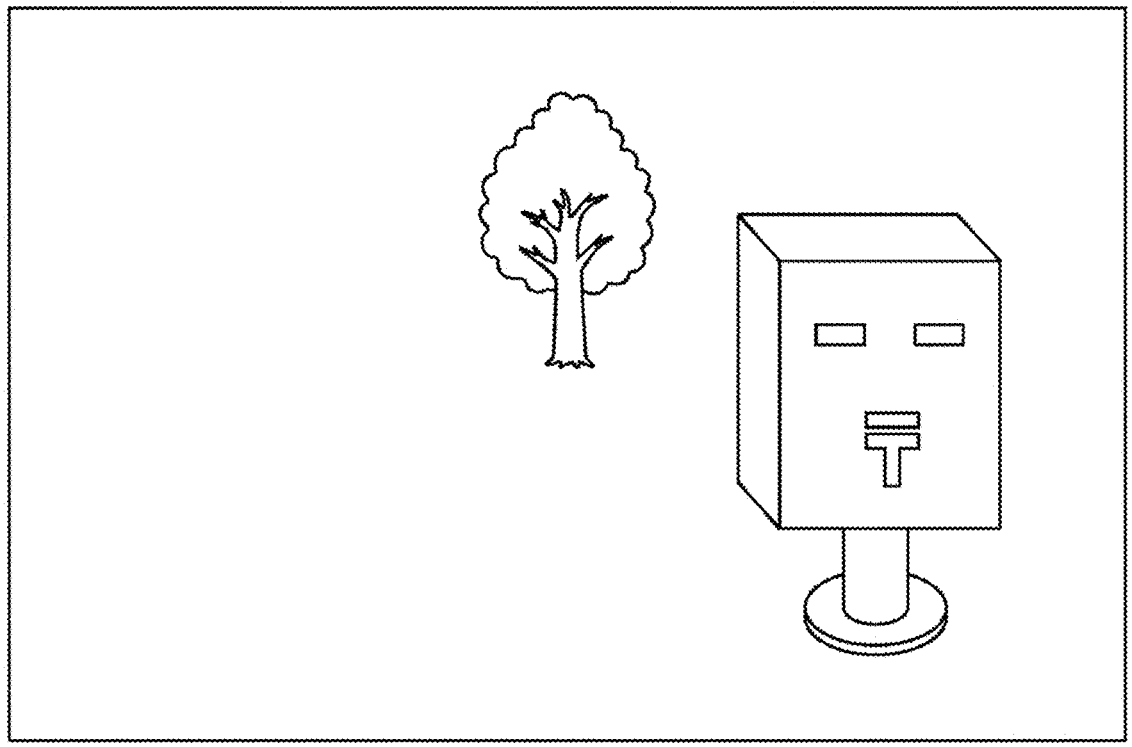
FIG. 15 is a diagram showing an image of the virtual environment shown in FIG. 14 observed from the viewpoint position of user A.
Figure 16:
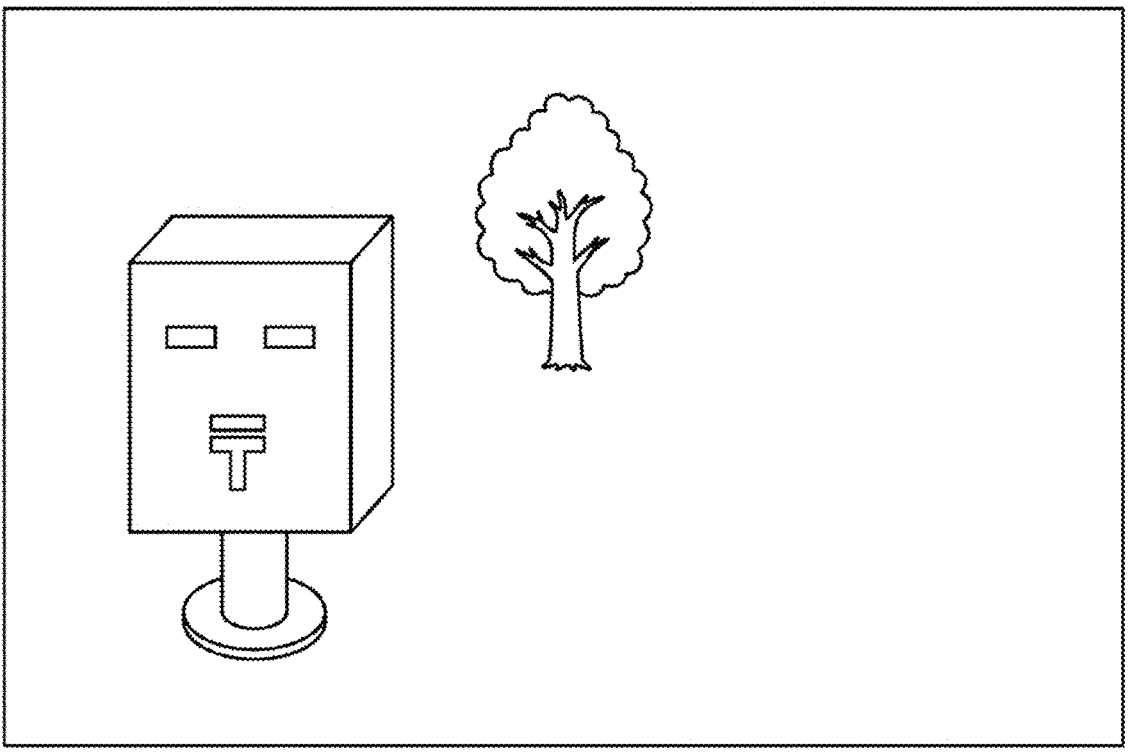
FIG. 16 is a diagram showing an image of the virtual environment shown in FIG. 14 observed from the viewpoint position of user B.

Objects far from the viewpoint have a small change due to motion parallax, but objects closer to the viewpoint have a large change due to motion parallax. For example, as shown in FIG. 14, it is assumed that a virtual environment 1400 has a tree 1401 in a distance and a mailbox 1402 in the front in the area where the view ranges of users A and B overlap. In such a case, the motion parallax of the distant tree 1401 is small, but the motion parallax of the front mailbox 1402 is large between users A and B. Therefore, it is considered appropriate that user A observes a VR image in which the tree 1401 is seen in the back on the left side of the mailbox 1402 in the front as shown in FIG. 15, while user B observes a VR image in which the tree 1401 is seen in the back on the right side of the mailbox 1402 in the front as shown in FIG. 16. However, if the image shown in FIG. 15, in which only the effect of motion parallax on user A is maintained, is constantly projected on the real environment by projection mapping, the motion parallax becomes unnatural for user B who observes the image, and the VR experience is disturbed.

Therefore, in the technology according to the present disclosure, the subject (object) included in the overlapping area where the fields of view of a plurality of users overlap is separated into the foreground and the background, the background image is treated as a common image since it has a small difference in motion parallax between the users, and optimum individual foreground images that reproduce the motion parallax according to the position, posture, and line of sight of each user are generated for respective users. Then, the background image common to the users is constantly projected and displayed using a first projector for background image projection, and the foreground images different for each user are projected and displayed using a second projector for foreground image projection in a time-division manner. Each user observes the real environment by wearing shutter glasses that open and close in synchronization with the switching to the foreground image for himself/herself. As a result, each user can view the VR image in which the optimum foreground image is superimposed on the background image common to the users. The optimum foreground image is a foreground image that maintains the effect of motion parallax for each user, and the user can have more perfect VR experience.

Both the first projector and the second projector project images in the real environment using the projection mapping technology. The first projector and the second projector may each be composed of a plurality of projector devices.

Figure 17:
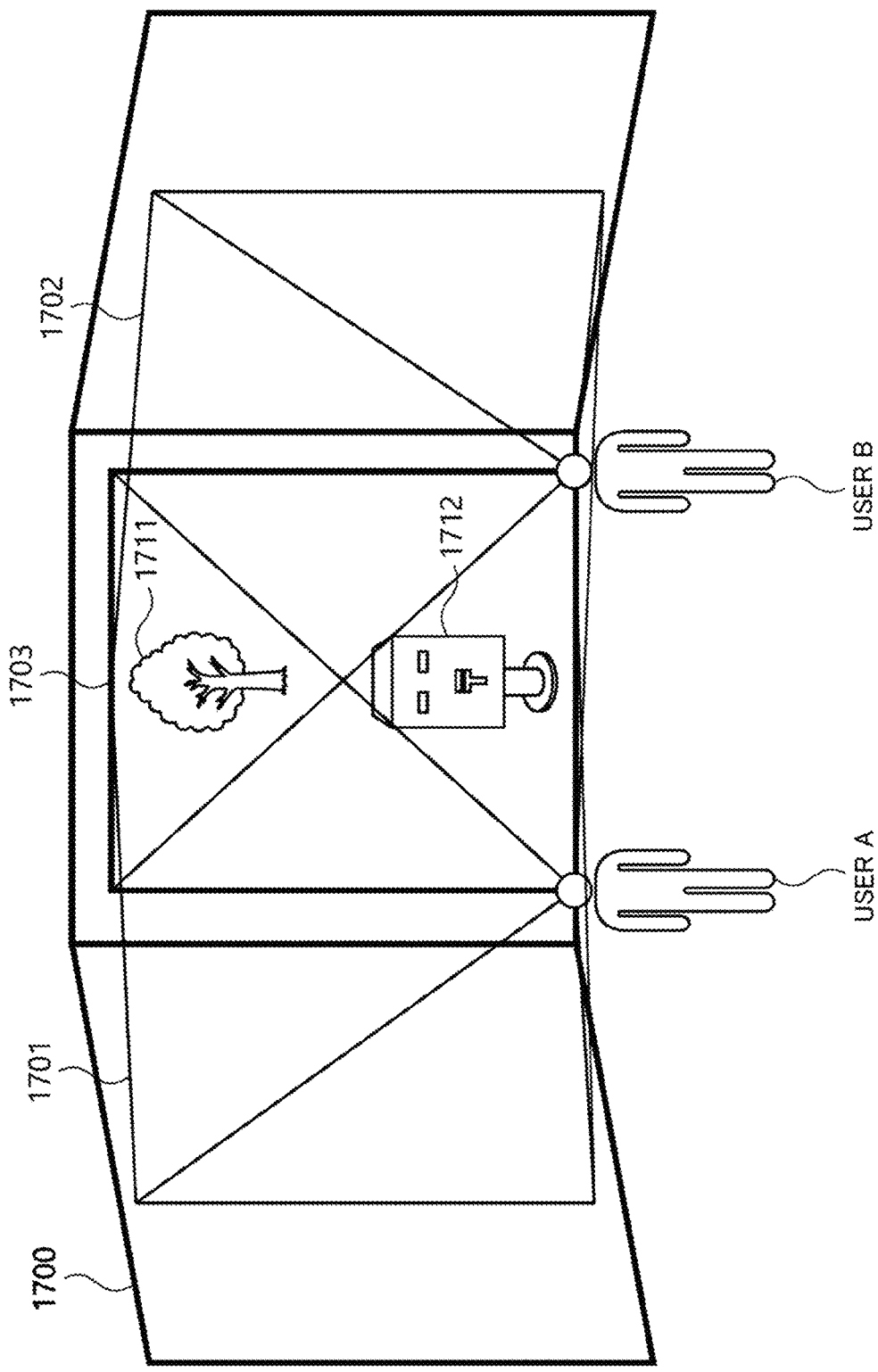
FIG. 17 is a diagram showing an example of performing projector stacking in a real environment shared by users A and B.

FIG. 17 shows an example of performing projector stacking in a real environment shared by users A and B. In the figure, it is assumed that the real environment is made up of a wall surface 1700 of a room on which a VR image is projected, and the virtual environment shown in FIG. 14 is projected by projector stacking.

First, when the information on the position, posture, and line of sight of users A and B is acquired and an overlapping area 1703 in which the view range 1701 of user A and the view range 1702 of user B overlap is specified, an object included in the overlapping area is classified into the foreground and the background. For example, the motion parallax of each object in the overlapping area 1703 may be calculated based on the position, posture, and line of sight of users A and B for each frame, an object having a small change due to the motion parallax may be classified as the background, and an object in which a change due to the motion parallax exceeds a predetermined value may be classified as the foreground. Here, an object in which the change due to motion parallax is small for one user but the change due to motion parallax is large for the other user may be classified as the foreground. In the example shown in FIG. 17, it is assumed that the tree 1711 in a distance is classified as the background and the mailbox 1712 in the front is classified as the foreground.

Figure 18:
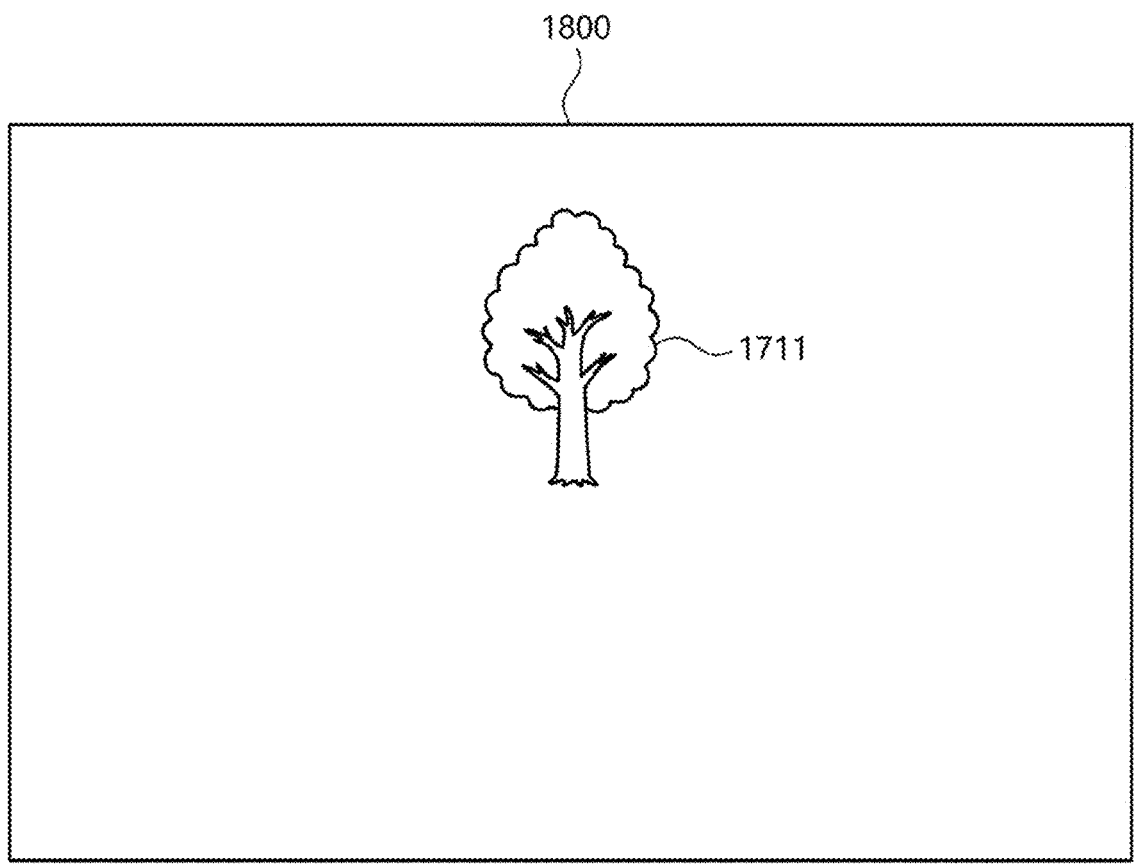
FIG. 18 is a diagram showing a background image separated from the virtual environment shown in FIG. 14.
Figure 19:
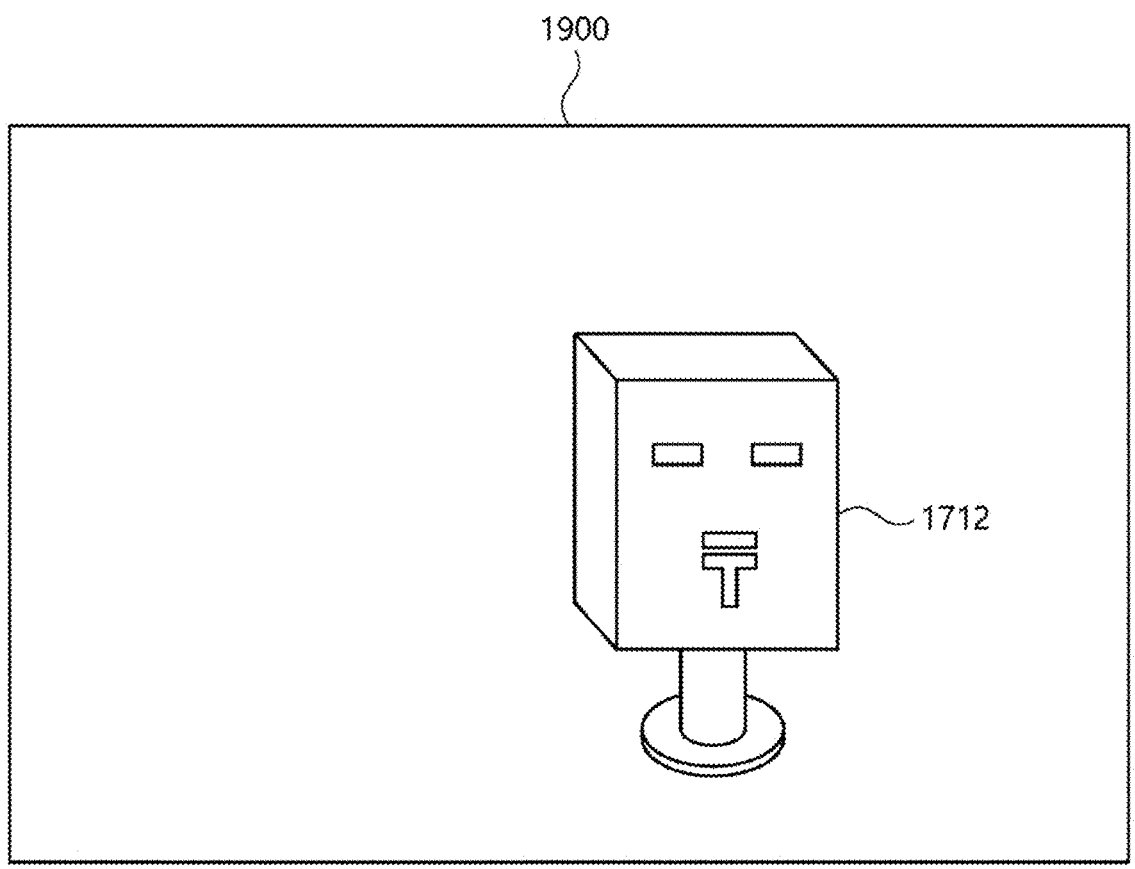
FIG. 19 is a diagram showing a foreground image in which an effect of motion parallax for user A is given to an object in the foreground separated from the virtual environment shown in FIG. 14.
Figure 20:
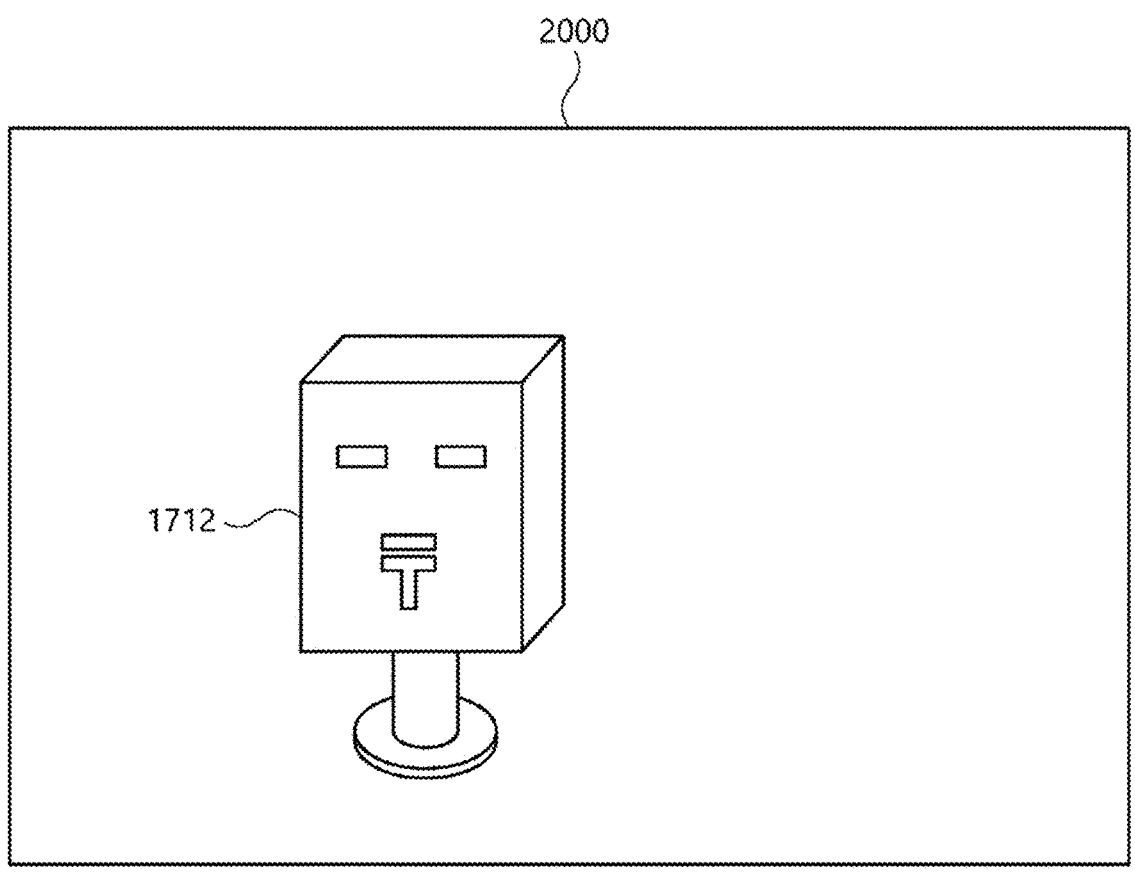
FIG. 20 is a diagram showing a foreground image in which an effect of motion parallax for user B is given to an object in the foreground separated from the virtual environment shown in FIG. 14.

Next, as shown in FIG. 18, a background image 1800 composed of an object 1711 classified as the background is generated. The background image 1800 is an image that is common to users A and B because the change due to the motion parallax is small. A foreground image 1702 for user A and a foreground image 1703 for user B are generated, respectively. Specifically, as shown in FIG. 19, the information on the position, posture, and line of sight of user A is acquired for each frame to generate a foreground image 1900 for user A such that the object 1712 classified as the foreground maintains the effect of motion parallax appropriate for user A. Similarly, as shown in FIG. 20, the information on the position, posture, and line of sight of user B is acquired for each frame to generate a foreground image 2000 for user B such that the object 1712 classified as the foreground maintains the effect of motion parallax appropriate for user B.

Figure 21:
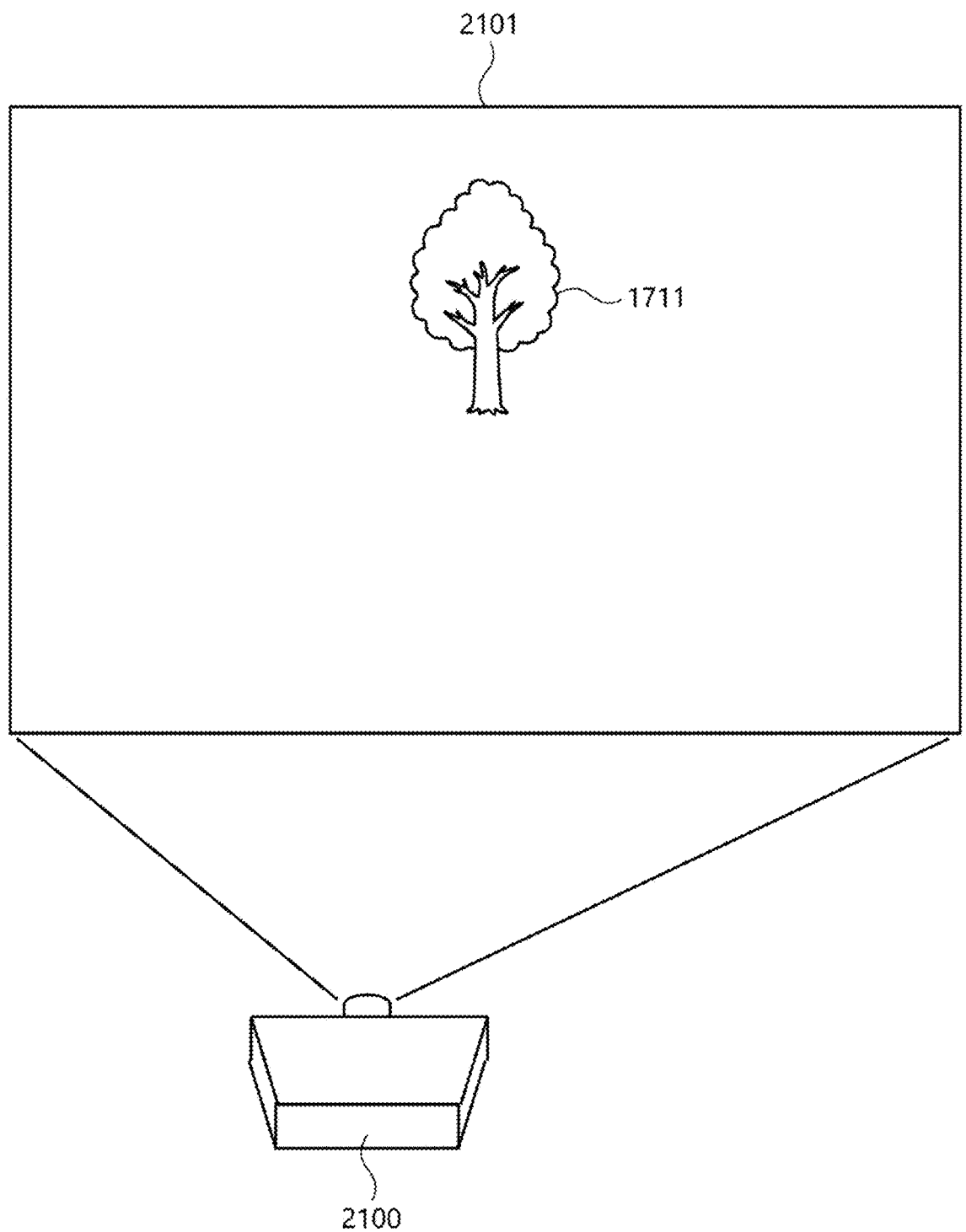
FIG. 21 is a diagram showing a state in which a background image is projected.
Figure 22:
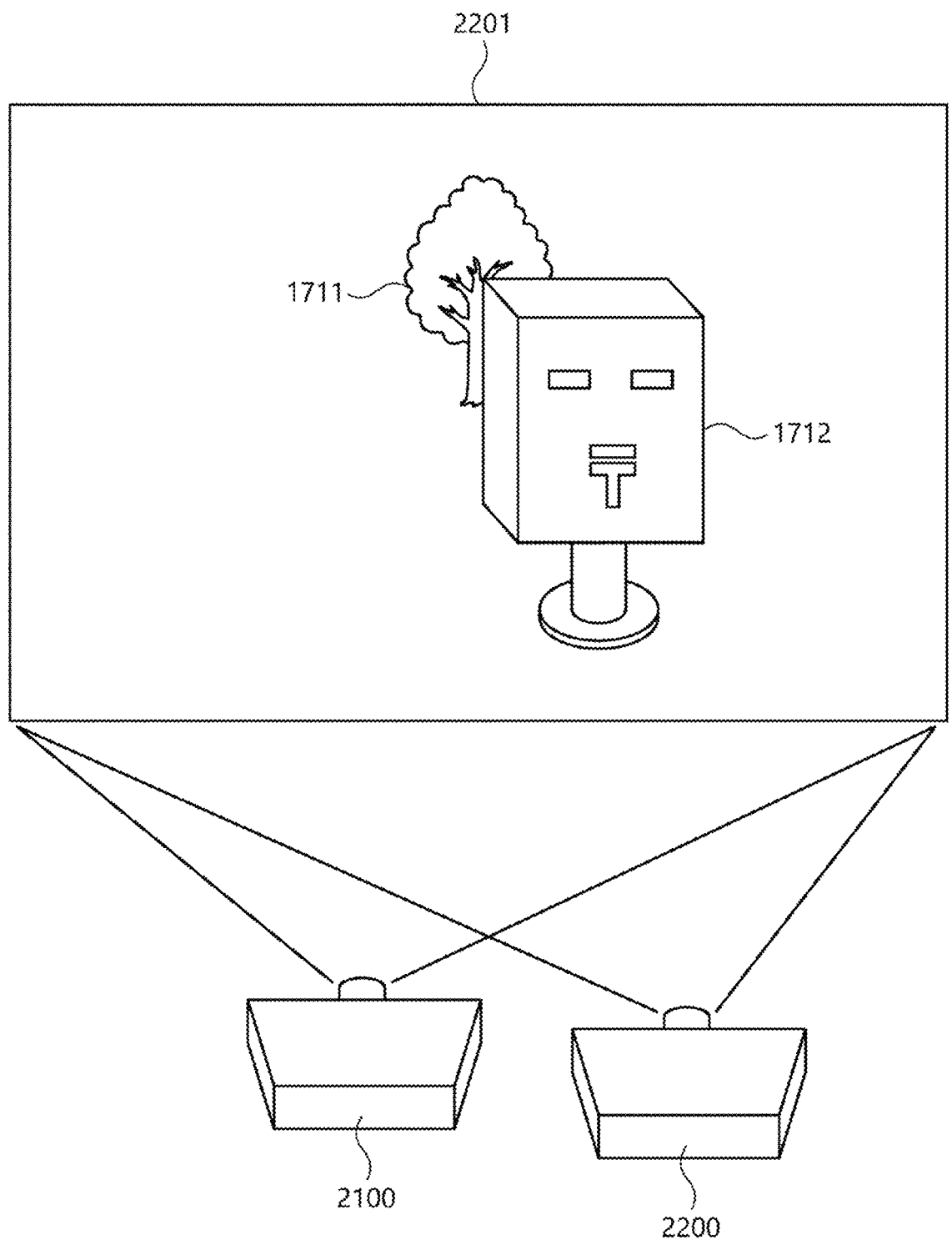
FIG. 22 is a diagram showing a state in which a foreground image for user A is superimposed and projected on a background image.

Then, the background object 1800 common to users A and B is constantly projected and displayed on the wall surface 1700 of the room using the first projector 2100 for background image projector as shown in FIG. 21. Further, when the foreground image 1900 for user A is superimposed on the background image 1800 using a second projector 2200 for foreground image projection, a projector-stacked projection image 2201 as shown in FIG. 22 is realized. The projection image 2201 is an image that maintains the effect of motion parallax that is appropriate for user A.

Figure 23:
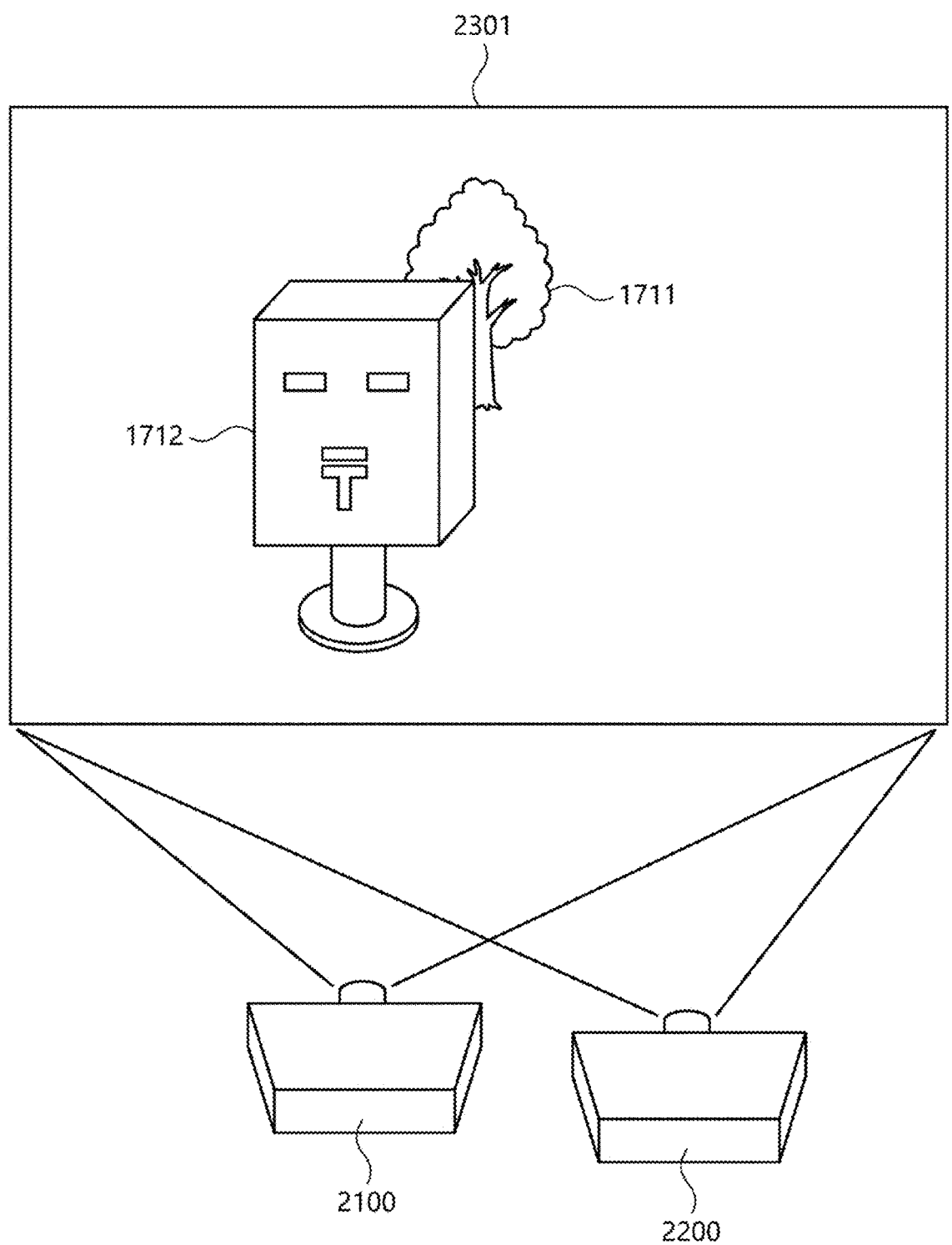
FIG. 23 is a diagram showing a state in which a foreground image for user B is projected on a background image.

Further, when the foreground image 2000 for user B is superimposed on the background image 1800 using the second projector 2200 for foreground image projection, a projector-stacked projection image 2300 as shown in FIG. 23 is realized. The projection image 2301 is an image that maintains the effect of motion parallax that is appropriate for user B.

Therefore, the background image 1800 common to users A and B is constantly projected and displayed on the wall surface 1700 of the room using the first projector 2100 for background image projection. The foreground image 1900 or 2000, which is different for users A and B, is projected on the wall surface 1700 of the room in a time-division manner using the second projector 2200 for foreground image projection, and is alternately superimposed and displayed on the background image 1800.

In FIGS. 21 to 23, for the sake of simplicity, only one first projector 2100 and one second projector 2200 are depicted, but in the case of displaying an image over a wide angle, the first projector 2100 and the second projector 2200 may each be composed of a plurality of projectors.

Figure 24:
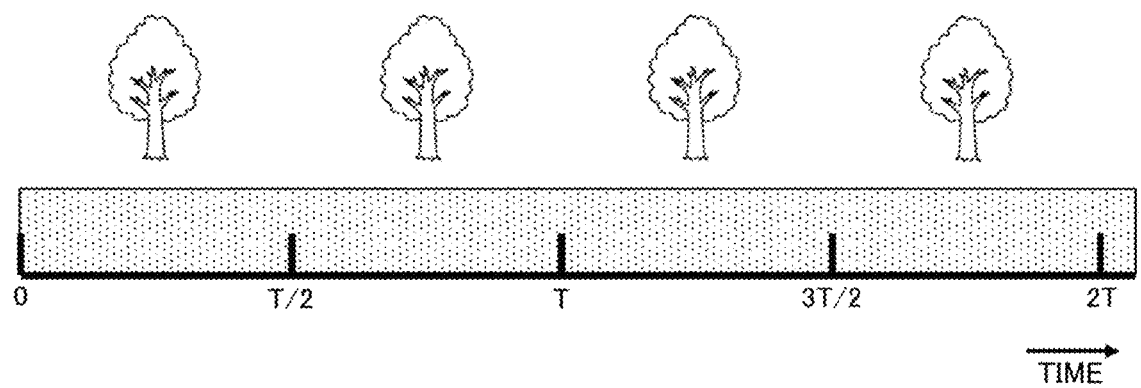
FIG. 24 is a diagram showing an operation example of a first projector 2100.
Figure 25:
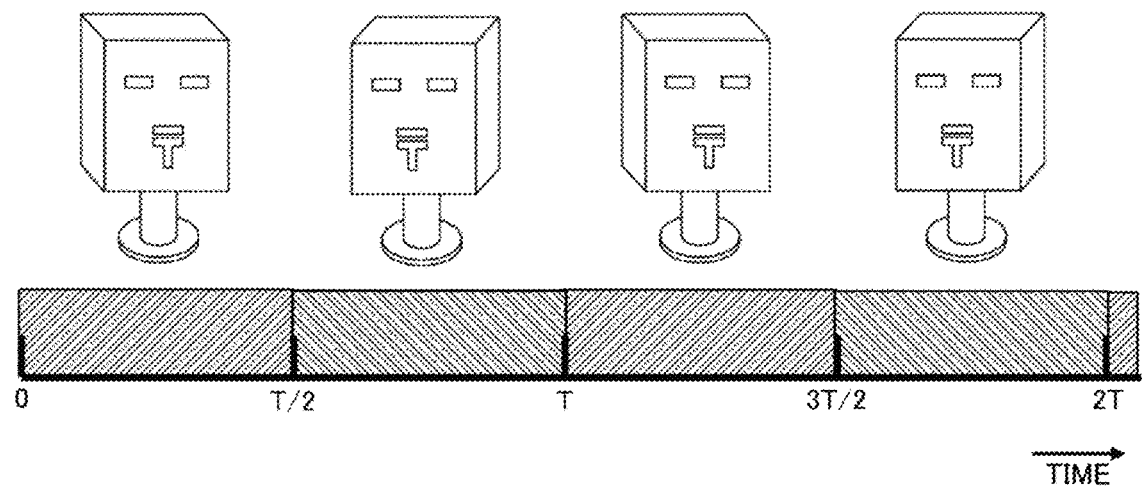
FIG. 25 is a diagram showing an operation example of a second projector 2200.

FIG. 24 shows an operation example of the first projector 2100. FIG. 25 shows an operation example of the second projector 2200. As shown in FIG. 24, the first projector 2100 constantly projects and displays the background image 1800 generated for each frame on the wall surface 1700 of the room. On the other hand, as shown in FIG. 25, the second projector 1712 divides the frame period T into two segments, and an image to be projected on the wall surface 1700 is sequentially switched between a segment of 0 to T/2 and a segment of T/2 to T for each frame period. In the segment of 0 to T/2 in the first half of the frame period T, the foreground image 1900 that maintains the effect of motion parallax corresponding to the position, posture, and line of sight of user A is projected. In the segment of T/2 to T in the latter half of the frame period T, the foreground image 2000 that maintains the effect of motion parallax corresponding to the position, posture, and line of sight of user B is projected.

Users A and B observe the real environment by wearing shutter glasses that open and close in synchronization with switching to the foreground image 1900 or 2000 for himself/herself. As a result, users A and B can view the VR image in which the optimum foreground image is superimposed on the background image common to the users. The optimum foreground image is a foreground image that maintains the effect of motion parallax for each user, and users A and B can have more perfect VR experience.

In FIGS. 17 to 25, an example in which the original content is separated into two types, a background common to users and a foreground for each user, and the background image and the foreground image are superimposed and displayed using two projectors is shown. As a modification, a method of separating the original content into three types of background, middle scene, and foreground can be considered. In this case, not only the foreground but also the middle scene has different effects due to the motion parallax for each user, and the effect due to the motion parallax differs from the foreground to the middle scene. Thus, a middle scene image for each user is generated similarly to the foreground image. In the real environment, in addition to the first projector for background image projection and the second projector for foreground image projection, a third projector for middle scene image projection is installed. Then, the third projector projects and displays the middle scene image that maintains the effect of motion parallax for each user in a time-division manner in synchronization with the switching of the foreground image. Therefore, each user observes the real environment by wearing shutter glasses that open and close in synchronization with the switching of the foreground image and the middle scene image for himself/herself. In this way, each user can observe the VR image that maintains the effect of motion parallax corresponding to the current position, posture, and line of sight of the user and have more perfect VR experience.

It is also conceivable that the projection image is a moving image and an object in the image moves. For example, when the subject is a moving object such as an automobile, the relative position with respect to an observing user changes from time to time. Thus, it is conceivable that the background switches to the foreground or the foreground switches to the background with the passage of time. The change due to the motion parallax of an automobile traveling in the background is small, but the change due to the motion parallax of the automobile traveling in the foreground is large.

Figure 26:
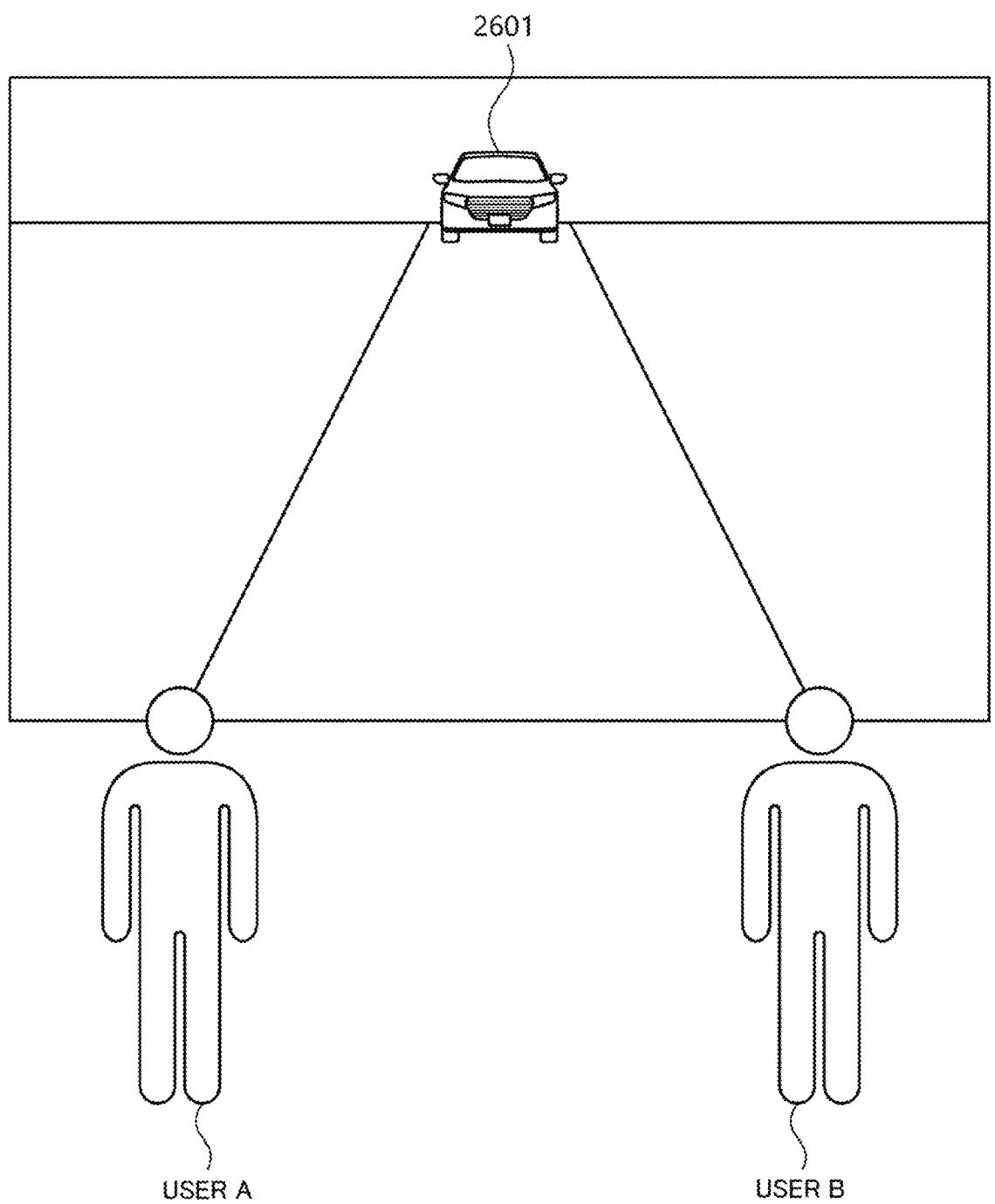
FIG. 26 is a diagram showing an image of an automobile traveling from a distance toward the front.

FIG. 26 illustrates an image of an automobile 2601 traveling from a distance toward the front in an area where the fields of view of users A and B overlap. At this time point, the automobile 2601 belongs to the background, and the motion parallax of the automobile 2601 is small for users A and B. Therefore, the image shown in FIG. 26 may be constantly projected and displayed using the first projector for background image projection.

Figure 27:
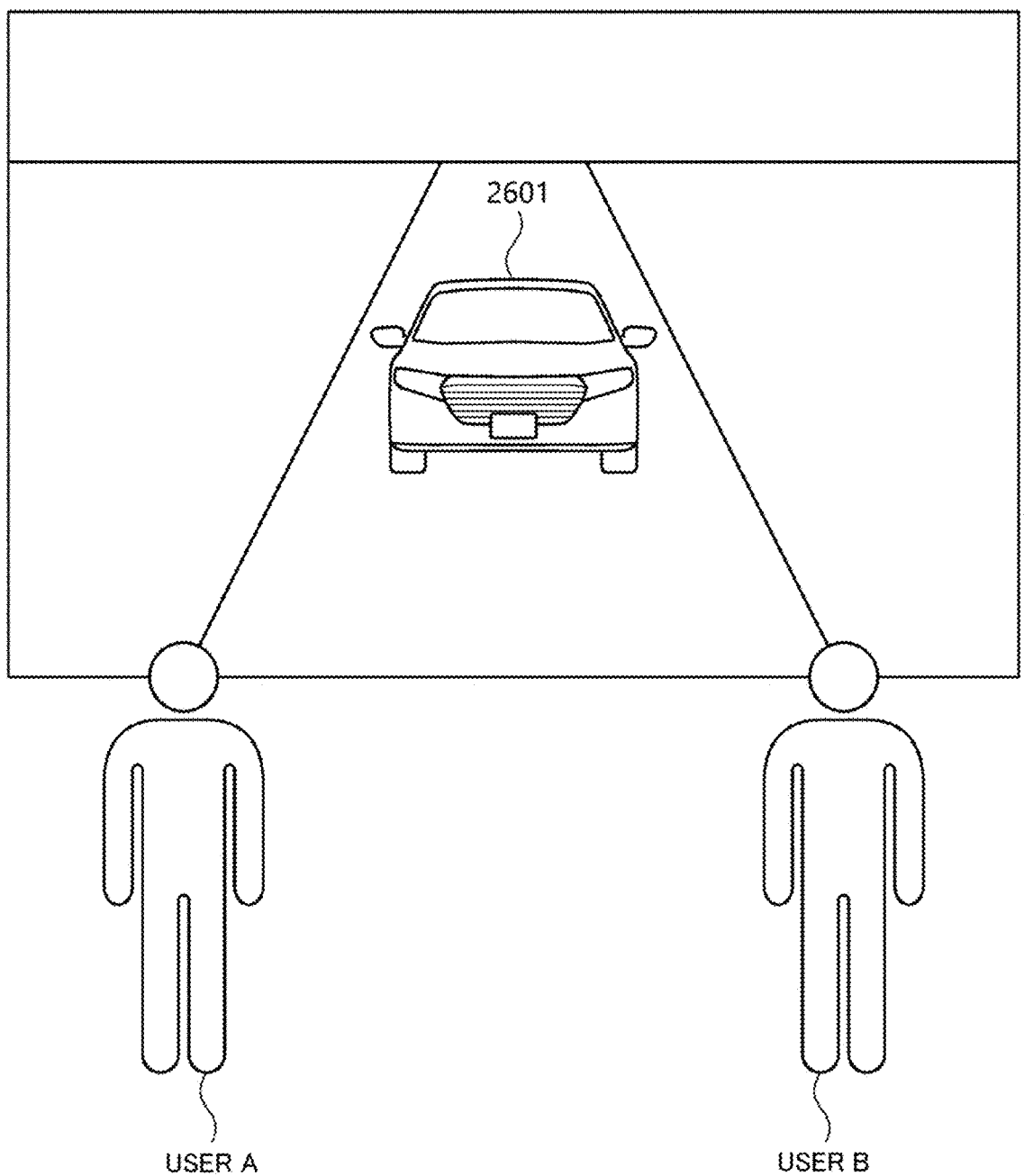
FIG. 27 is a diagram showing an image of an automobile traveling from a distance toward the front.
Figure 28:
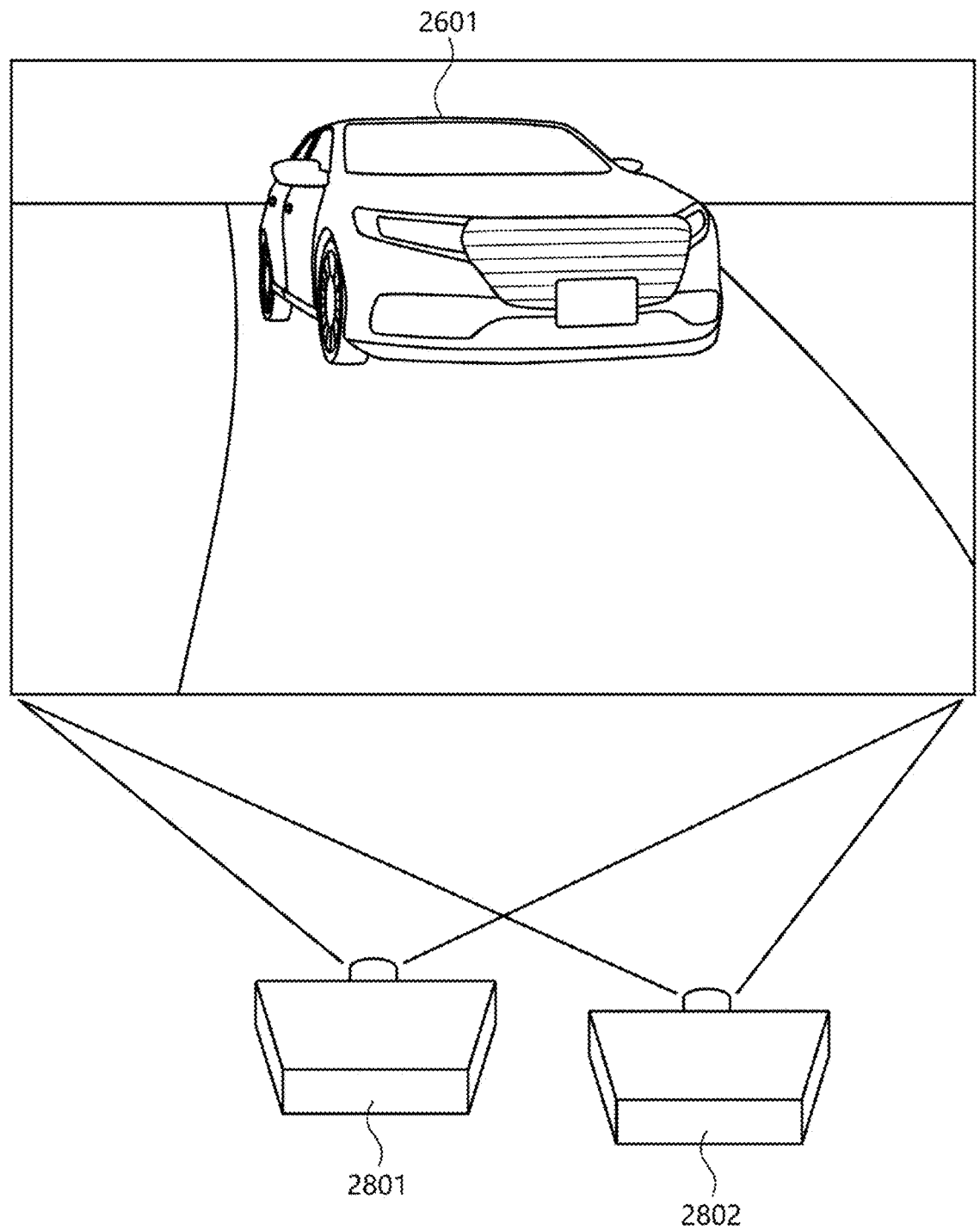
FIG. 28 is a diagram showing an image for user A when the automobile reaches the foreground area.

FIG. 27 illustrates an image in which the automobile 2601 continues to travel toward the front and reaches the foreground area. At this time point, the motion parallax of the automobile 2601 is large for users A and B. Therefore, the motion parallax of the automobile 2601 is calculated based on the position, posture, and line of sight of user A for each frame, and the foreground image for user A including the automobile 2601 is generated. Then, the foreground image including the automobile 2601 is superimposed and projected on the background image projected by the first projector 2801 for background image projection using the second projector 2802 for foreground image projection. In this way, it is possible to display a projection image that maintains the effect of motion parallax that is appropriate for user A as shown in FIG. 28.

Similarly, the motion parallax of the automobile 2601 is calculated based on the position, posture, and line of sight of user B for each frame, and a foreground image for user B including the automobile 2601 is generated. Then, the foreground image including the automobile 2601 is superimposed and projected on the background image projected by the first projector 2801 for background image projection using the second projector 2802 for foreground image projection. In this way, it is possible to display a projection image that maintains the effect of motion parallax that is appropriate for user B as shown in FIG. 29.

Therefore, the background image common to users A and B is constantly projected and displayed using the first projector 2801. Using the second projector 2802, the foreground images different for users A and B are projected in a time-division manner and alternately superimposed and displayed on the background image. FIG. 30 shows an operation example of the second projector 2802 that projects the foreground image. The operation of the first projector 2801 is not shown, but the first projector 2801 constantly projects and displays the background image. In FIG. 30, for convenience, the timing at which the automobile 2601 reaches the foreground is set to time 0. Then, the second projector 2802 sequentially switches the image to be superimposed and projected on the background image in the real environment between the segment of 0 to T/2 and the segment of T/2 to T for each frame period. In the segment of 0 to T/2 in the first half of the frame period T, an image of the automobile 2601 (see FIG. 28) that maintains the effect of motion parallax corresponding to the position, posture, and line of sight of user A is projected. In the segment of T/2 to T in the latter half of the frame period T, an image of the automobile 2601 (see FIG. 29) that maintains the effect of motion parallax corresponding to the position, posture, and line of sight of user B is projected.

Users A and B observe the real environment by wearing shutter glasses that open and close in synchronization with switching to the foreground image for himself/herself. As a result, users A and B can view the VR image in which the foreground image of the automobile 2601 optimum for each user is superimposed on the background image common to the users. The optimum foreground image is a foreground image that maintains the effect of motion parallax for each user, and users A and B can have more perfect VR experience.

Figure 29:
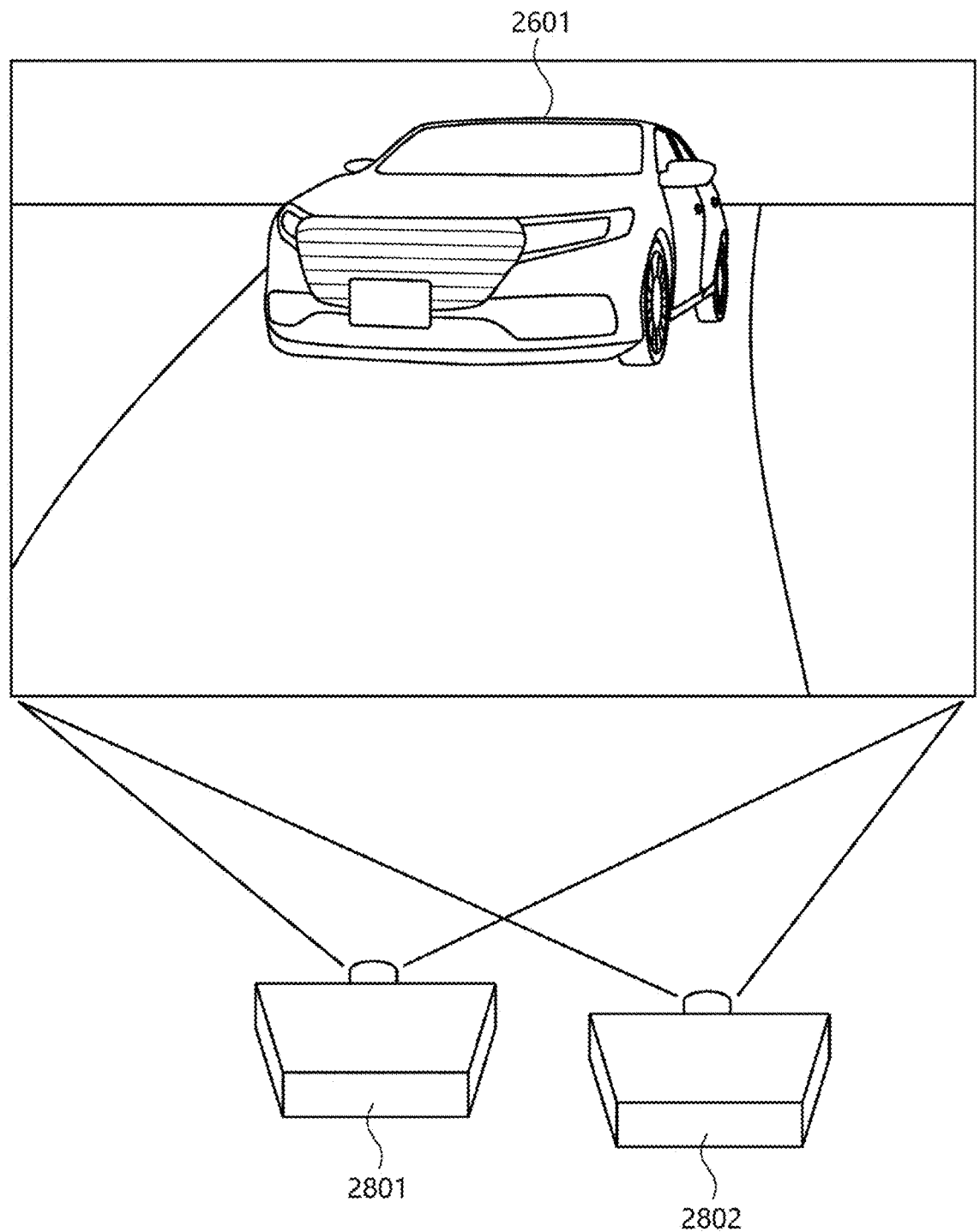
FIG. 29 is a diagram showing an image for user A when the automobile reaches the foreground area.
Figure 30:
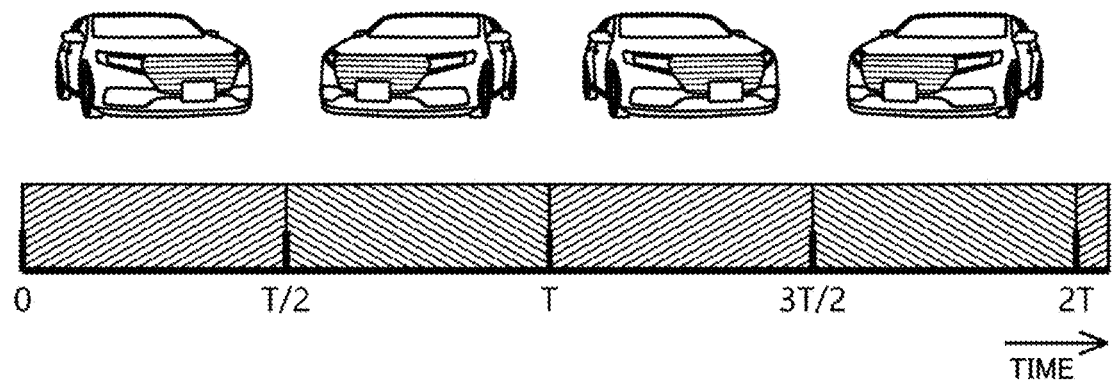
FIG. 30 is a diagram showing an operation example of a second projector 2802 that projects a foreground image.

In FIGS. 28 and 29, for the sake of simplicity, only one first projector 2801 and one second projector 2802 are depicted, but in the case of displaying an image over a wide angle, the first projector 2801 and the second projector 2802 may each be composed of a plurality of projectors.

Hereinabove, an example of performing projector stacking to display a foreground image in which the effect of motion parallax is given for each user has been described. As a modification, projector stacking may be used to superimpose an individual foreground image prepared for each user on a background image common to users even if there is no effect of motion parallax.

Figure 31:
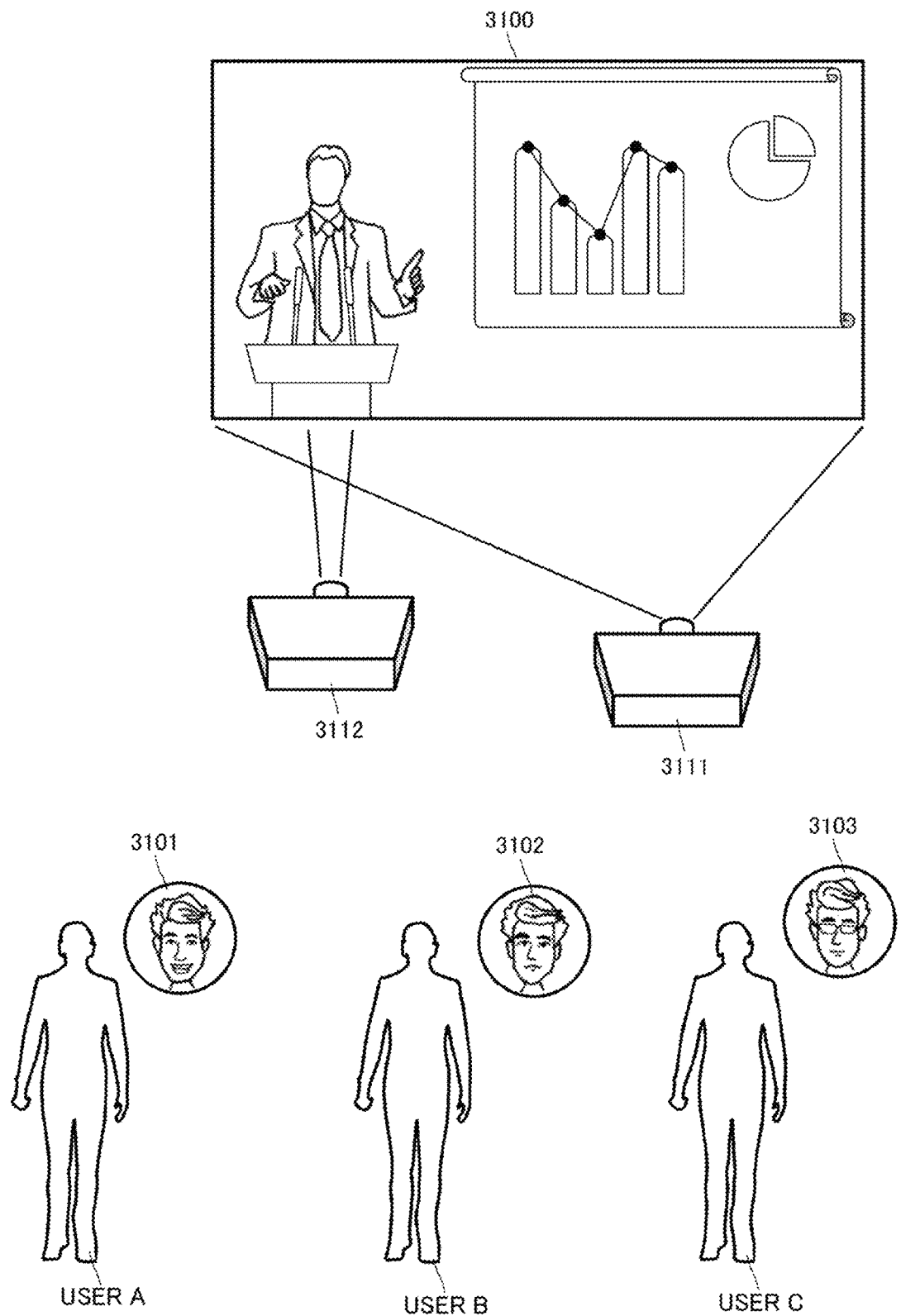
FIG. 31 is a diagram showing a display example of projector stacking in which individual foreground images for each user are superimposed on a common background image in a time-division manner.
Figure 32:
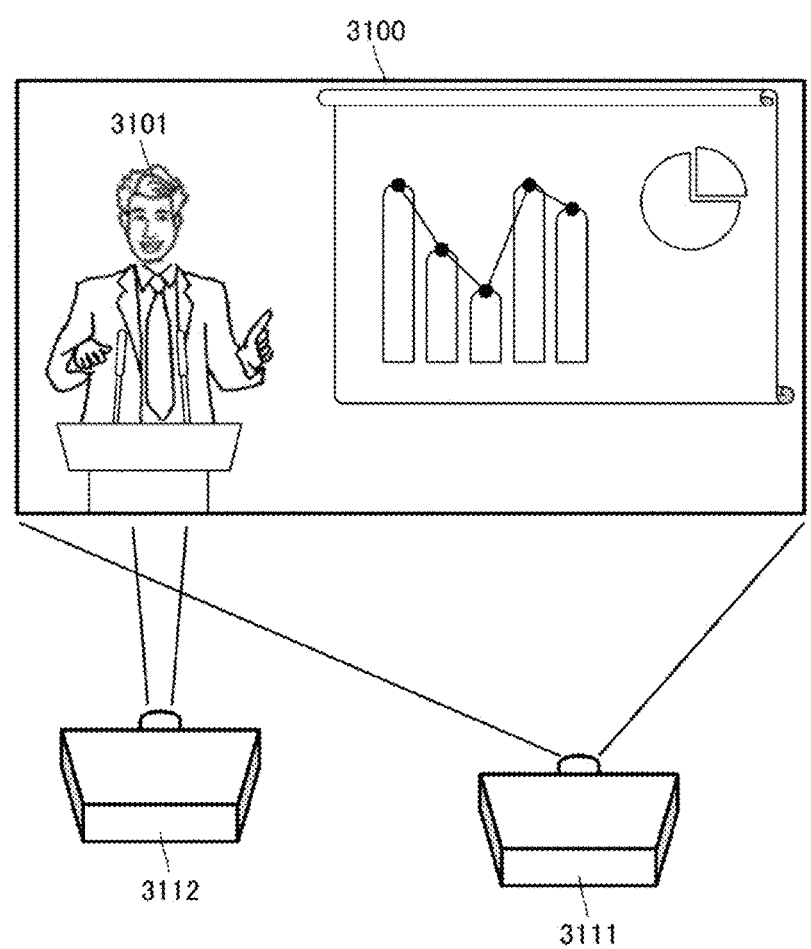
FIG. 32 is a diagram showing a display example of projector stacking in which a foreground image for user A is superimposed on a common background image.
Figure 33:
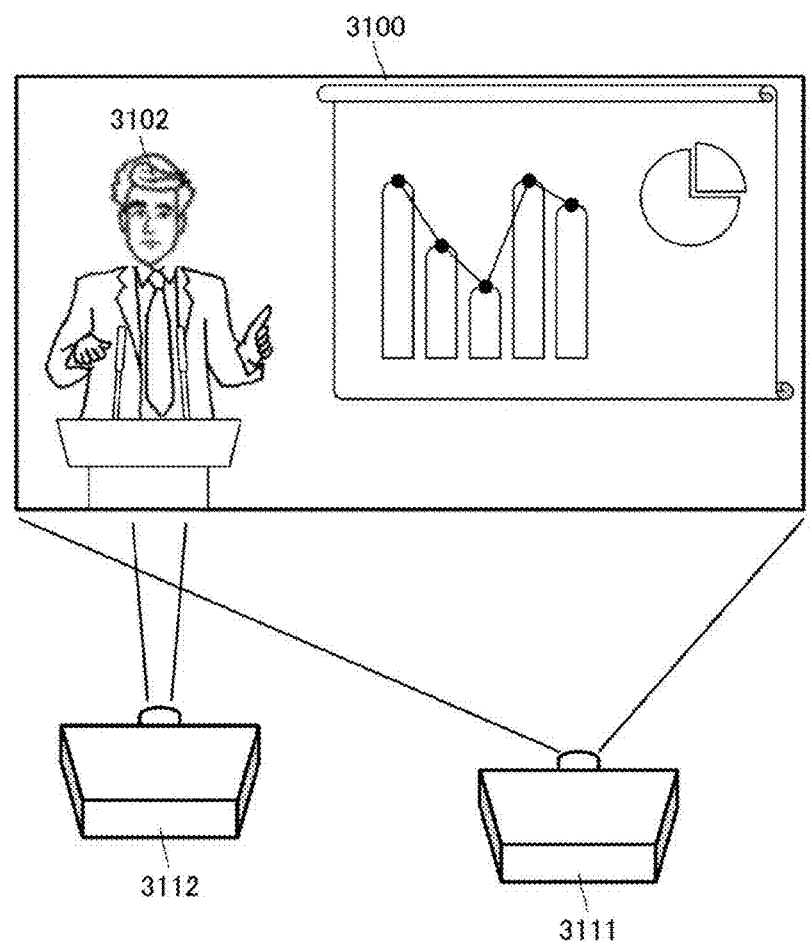
FIG. 33 is a diagram showing a display example of projector stacking in which a foreground image for user B is superimposed on a common background image.
Figure 34:
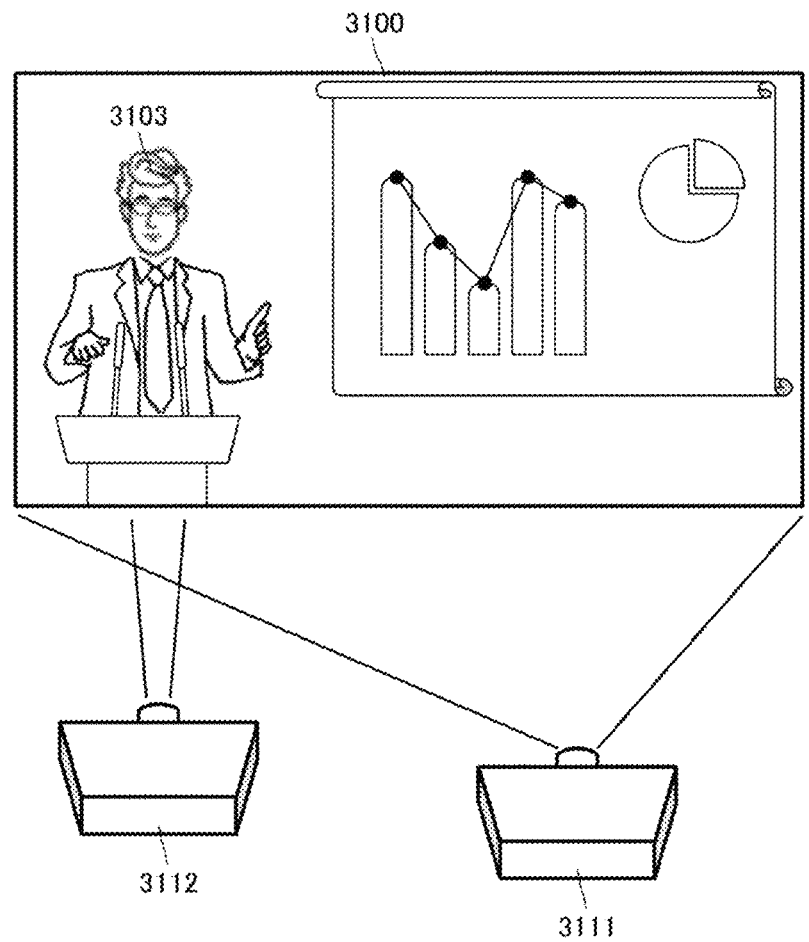
FIG. 34 is a diagram showing a display example of projector stacking in which a foreground image for user C is superimposed on a common background image.

FIG. 31 shows a display example of projector stacking in which individual foreground images 3101, 3102, and 3103 prepared for each user are superimposed on a background image 3100 common to users A, B, and C in a time-division manner. In the shown example, the background image 3100 is an image in which a speaker who is on the stage gives a presentation, and the foreground images 3101, 3102, and 3103 are the face images of the speaker prepared for each user. FIG. 32 shows a state in which the face image 3101 for user A is superimposed on the face of the speaker in the background image 3100. FIG. 33 shows a state in which the face image 3102 for user B is superimposed on the face of the speaker in the background image 3100, and FIG. 34 shows a state in which the face image 3103 for user C is superimposed on the face of the speaker in the background image 3100. The face image to be prepared for each of users A, B, and C is determined based on a predetermined logic such as the preference and compatibility of each user, but the details thereof will be omitted.

Figure 35:
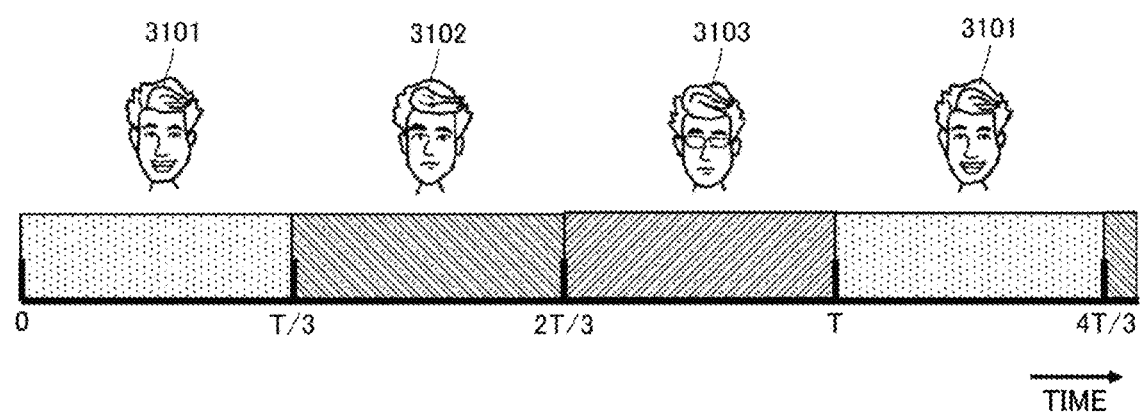
FIG. 35 is a diagram showing an operation example of a second projector 3112 that projects a foreground image.

The background image 3100 is constantly projected and displayed using the first projector 3111. Further, using the second projector 3112, the individual foreground images 3101, 3102, and 3103 prepared for each user are superimposed and projected on the background image 3100 in a time-division manner. FIG. 35 shows an operation example of the second projector 3112. The second projector 3112 divides the frame period T into three segments, and sequentially switches an image to be projected between the segment of 0 to T/3, the segment of T/3 to 2 T/3, and the segment of 2 T/3 to T for each frame period. In the first segment of 0 to T/3 of the frame period T, the second projector 3112 superimposes and projects the foreground image 3101 for user A on the background image 3100. In the subsequent segment of T/3 to 2 T/3, the second projector 3112 superimposes and projects the foreground image 3102 for user B on the background image 3100. In the subsequent segment of 2 T/3 to T, the second projector 3112 superimposes and projects the foreground image 3103 for user C on the background image 3100.

Users A to C observe the real environment by wearing shutter glasses that open and close in synchronization with switching to the foreground images 3101 to 3103 for himself/herself. As a result, users A to C can view the VR image in which the optimum foreground image is superimposed on the background image common to the users.

In FIGS. 31 to 34, for the sake of simplicity, only one first projector 3111 and one second projector 3112 are depicted, but in the case of displaying an image over a wide angle, the first projector 3111 and the second projector 3112 may each be composed of a plurality of projectors.

Figure 36:
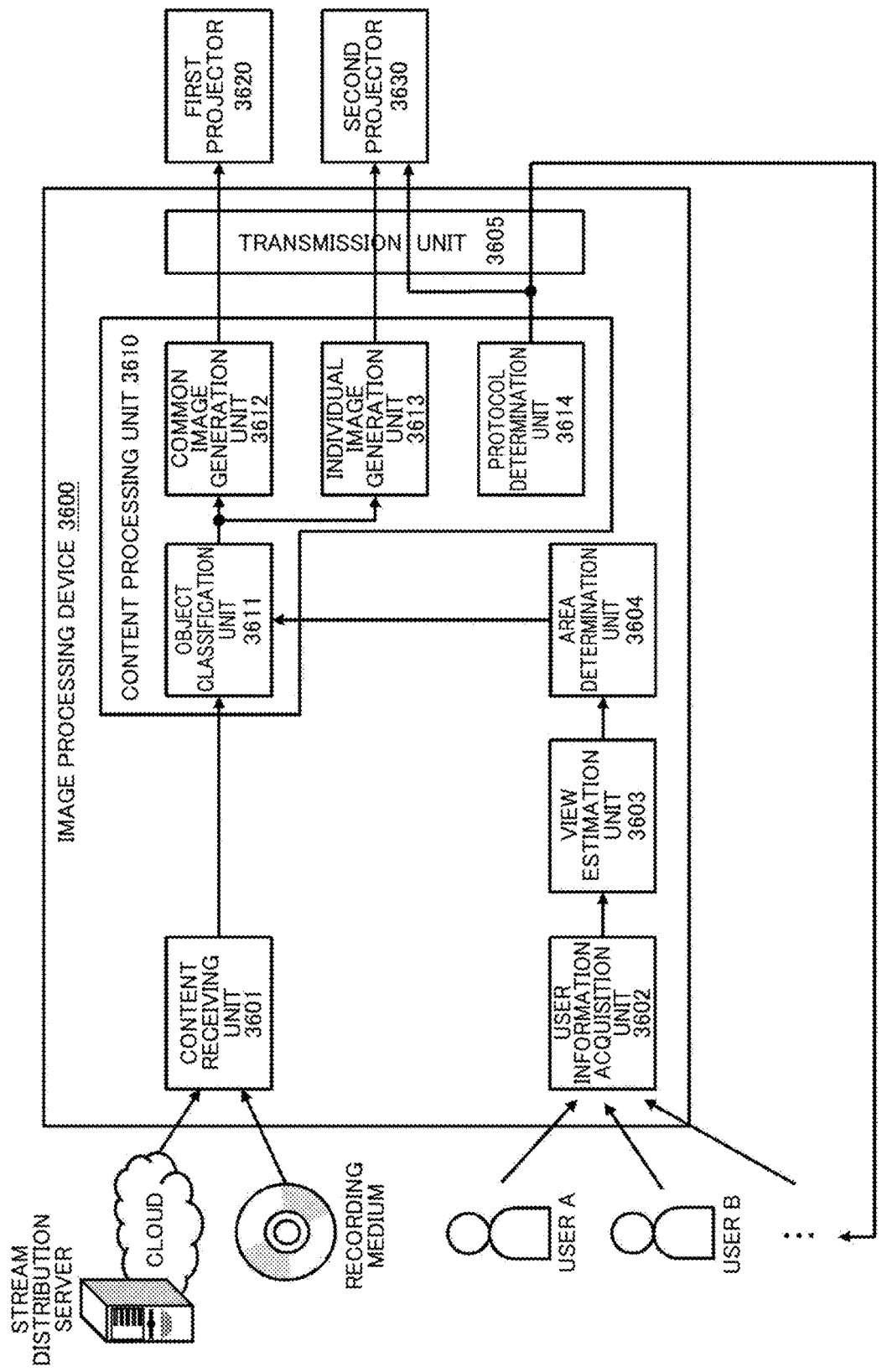
FIG. 36 is a diagram showing a functional configuration example of an image processing device 3600.

FIG. 36 shows a functional configuration example of an image processing device 3600 that performs processing for realizing projector stacking. The shown image processing device 3600 includes a content receiving unit 3601, a user information acquisition unit 3602, a view estimation unit 3603, an overlapping area determination unit 3604, a transmitting unit 3605, and a content processing unit 3610. The content processing unit 3610 includes an object classification unit 3611, a common image generation unit 3612, an individual image generation unit 3613, and an output protocol determination unit 3614. The image processing device 3600 can be configured using an information processing device such as a personal computer (PC).

The content receiving unit 3601 receives stream data of content from a content source such as a stream distribution server on the cloud or recording media. The content receiving unit 3601 includes, for example, a communication interface such as Wi-Fi (registered trademark), Ethernet (registered trademark), HDMI (registered trademark) (High-Definition Multimedia Interface).

The user information acquisition unit 3602 performs a process of acquiring information of each user who observes a projection image to be subject to projection mapping or projector stacking by the image processing device 3600. The user information acquisition unit 3602 acquires, for example, information such as a position, a posture, and a field of view for specifying the view of each user. The user information acquisition unit 3602 may acquire profile information and sensitive information of each user in order to assign an individual foreground image to each user. The user information acquisition unit 3602 may be equipped with one or more sensor devices in order to acquire the above-described user information.

The view estimation unit 3603 estimates the viewing area of each user based on the user information (for example, information such as the position, posture, and field of view of each user) acquired by the user information acquisition unit 3602.

The overlapping area determination unit 3604 determines whether or not an overlapping area in which the fields of view of the users overlap is present based on the viewing area of each user estimated by the view estimation unit 3603, and further identifies the range of the overlapping area.

When the overlapping area determination unit 3604 determines that the fields of view of users overlap, the object classification unit 3611 classifies objects included in the overlapping area among the objects (subjects) included in the original content received by the content receiving unit 3601 into a first object group and a second object group. The first object group is a group of objects that are present in the background far away from the user's position and have a small motion parallax between users. On the other hand, the second object group is a group of objects that are present in the foreground close to the user's position and have a large motion parallax between users. The determination whether an object belongs to the background or foreground is performed for each frame.

The common image generation unit 3612 generates a background image which is common to users and is composed of objects of the first object group present in the background from the original content in the overlapping area where the fields of view of the users overlap. The background image generated by the common image generation unit 3612 is output to the first projector 3620 via the transmitting unit 3605.

The individual image generation unit 3613 generates a foreground image which is different for each user and is composed of objects of the second object group present in the foreground from the original content in the overlapping area where the fields of view of the users overlap. The individual image generation unit 3613 generates an individual image corresponding to the field of view of each user from the original content when the fields of view of the users do not overlap. The individual image for each user generated by the individual image generation unit 3613 is output to the second projector 3630 via the transmitting unit 3605.

The first projector 3620 projects the background image common to users generated by the common image generation unit 3612 on a real environment such as a wall surface of a room. The second projector 3630 projects the individual image for each user generated by the individual image generation unit 3613 on a real environment such as a wall surface of a room. When the individual images of each user overlap, the second projector 3630 switches and outputs the individual images in a time-division manner according to the output protocol determined by the output protocol determination unit 3614.

Both the first projector 3620 and the second projector 3630 measure the three-dimensional shape of a projection surface in a real environment such as the wall surface of a room, and perform projection mapping of projecting a distortion-free image by correcting the projection image according to the measurement result.

The output protocol determination unit 3614 determines a protocol for outputting the individual image generated for each user by the individual image generation unit 3613 to the second projector 3630. The output protocol determination unit 3614 determines an output protocol for projector-stacking the individual images for each user generated by the individual image generation unit 3613 on the common image common to the users generated by the common image generation unit 3612. The output protocol determination unit 3614 determines a protocol for switching and outputting the individual images in a time-division manner when projecting a plurality of overlapping individual images from the second projector 3630. The output protocol determination unit 3614 outputs the determined output protocol to the second projector 3630 and the shutter glasses (not shown) of each user via the transmitting unit 3605.

The transmitting unit 3605 is provided with a communication interface such as Wi-Fi (registered trademark), Ethernet (registered trademark), and HDMI (registered trademark).

Figure 37:
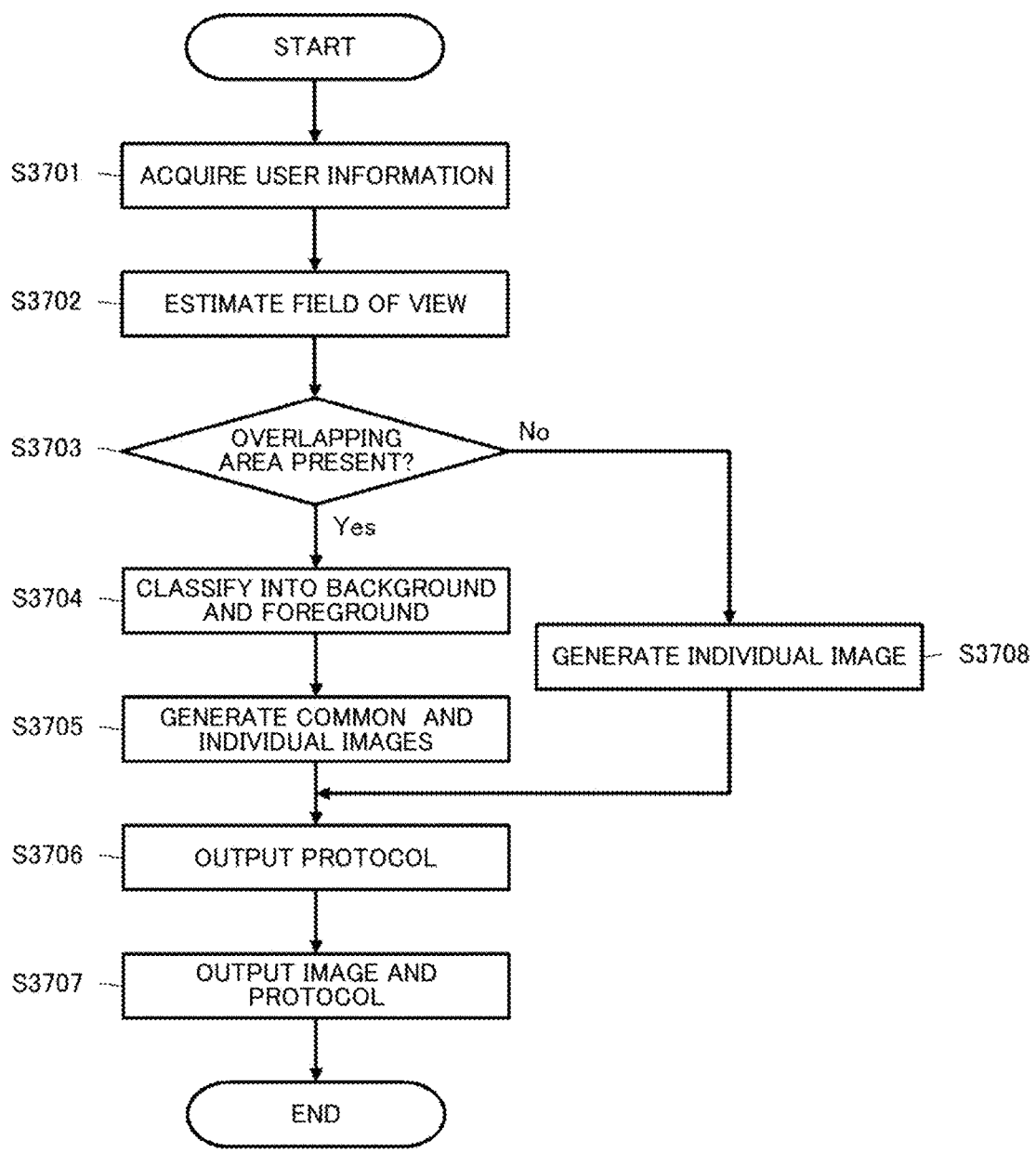
FIG. 37 is a flowchart showing a processing procedure executed by the image processing device 3600.

FIG. 37 shows a processing procedure in which the image processing device 3600 shown in FIG. 36 performs projection mapping or projector stacking in the form of a flowchart. This processing procedure is activated, for example, when the image processing device 3600 receives the content to be subject to projection mapping or projector stacking via the content receiving unit 3601.

The user information acquisition unit 3602 performs a process of acquiring information of each user who observes a projection image to be subject to projection mapping or projector stacking by the image processing device 3600 (step S3701). In this example, it is assumed that the user information acquisition unit 3602 acquires information such as a position, a posture, and a field of view for specifying the view of each user.

Next, the view estimation unit 3603 estimates the viewing area of each user based on the information such as the position, posture, and field of view of each user acquired by the user information acquisition unit 3602 (step S3702).

The overlapping area determination unit 3604 determines whether or not an overlapping area in which the fields of view of the users overlap is present based on the viewing area of each user estimated by the view estimation unit 3603 (step S3703). Then, when the overlapping area determination unit 3604 determines that there is an overlapping area, the overlapping area determination unit 3604 further specifies the range of the overlapping area.

When the overlapping area determination unit 3604 determines that the fields of view of the users overlap (Yes in step S3703), the object classification unit 3611 classifies objects included in the overlapping area among the objects (subjects) included in the original content received by the content receiving unit 3601 into a first object group and a second object group (step S3705). The determination whether an object belongs to the background or foreground is performed for each frame.

Then, the common image generation unit 3612 generates a background image which is common to users and is composed of objects of the first object group present in the background from the original content in the overlapping area where the fields of view of the users overlap. The individual image generation unit 3613 generates a foreground image which is different for each user and is composed of objects of the second object group present in the foreground from the original content in the overlapping area where the fields of view of the users overlap (step S3705).

On the other hand, when the overlapping area determination unit 3604 determines that the fields of view of the users do not overlap (No in step S3703), the individual image generation unit 3613 generates an individual image corresponding to the field of view of each user from the original content (step S3708). At this time, the object classification process by the object classification unit 3611 is not executed. Further, since the overlapping area is not present, the common image generation unit 3612 does not perform the process of generating a common image in the overlapping area.

Next, the output protocol determination unit 3614 determines a protocol for outputting the individual image generated for each user by the individual image generation unit 3613 to the second projector 3630 (step S3706).

Then, the background image generated by the common image generation unit 3612 is output to the first projector 3620 via the transmitting unit 3605. The individual image for each user generated by the individual image generation unit 3613 is output to the second projector 3630 via the transmitting unit 3605. The output protocol determination unit 3614 outputs the determined output protocol to the second projector 3630 and the shutter glasses (not shown) of each user via the transmitting unit 3605 (step S3707).

The first projector 3620 projects the background image common to users generated by the common image generation unit 3612 on a real environment such as a wall surface of a room. The second projector 3630 projects the individual image for each user generated by the individual image generation unit 3613 on a real environment such as a wall surface of a room. When the individual images of each user overlap, the second projector 3630 switches and outputs the individual images in a time-division manner according to the output protocol determined by the output protocol determination unit 3614.

By performing projection mapping and projector stacking on the images processed by the image processing device 3600 using the first projector 3620 and the second projector 3630 in this way, even when the fields of view of the users overlap, each user can have perfect VR experience without being disturbed by the VR images of other users. At that time, the user does not need to wear a heavy object such as a head-mounted display, and only needs to wear lightweight shutter glasses.

INDUSTRIAL APPLICABILITY

The technology according to the present disclosure has been described in detail above with reference to a specific embodiment. However, it will be apparent to those skilled in the art that modifications, substitutions, and the like can be made in the embodiments without departing from the gist of the technology according to the present disclosure.

The technology according to the present disclosure can be applied when presenting VR content to a plurality of users in various real environments.

In short, the technology according to the present disclosure has been described in the form of an example, and the contents of the present specification should not be construed in a limited manner. The gist of the technology according to the present disclosure should be determined in consideration of the claims.

The technology disclosed in the present disclosure may also be configured as follows.

(1) An image processing device that executes processing on content to be displayed to a plurality of users, including: a user information acquisition unit that acquires information on each user; a classification unit that specifies an overlapping area in which fields of view of two or more users overlap based on the information on each user and classifies objects included in the overlapping area into a first object group and a second object group; a generation unit that generates a common image common to all users, made up of the first object group and generates individual images different for each user, made up of the second object group; and a determination unit that determines an output protocol for displaying the individual images.

(2) The image processing device according to (1), wherein the classification unit classifies the objects included in the overlapping area into the first object group present in a background and the second object group which is a foreground for at least some users, and the generation unit generates a background image including the first object group as a common image and generates a foreground image for each user including the second object group as the individual image.

(3) The image processing device according to (2), wherein the generation unit generates an individual foreground image in which each object included in the second object group has an effect of motion parallax for each user.

(4) The image processing device according to (2), wherein the generation unit generates an individual image including an object assigned to each user in the second object group.

(5) The image processing device according to any one of (1) to (4), wherein the user information acquisition unit acquires information for specifying a field of view of each user.

(6) The image processing device according to any one of (1) to (5), wherein the user information acquisition unit acquires information on a position and a line of sight of each user, and the classification unit performs the classification based on a distance between each user and each object.

(7) The image processing device according to any one of (1) to (6), wherein the common image is output to a first display device, and the individual image for each user is output to a second display device.

(8) The image processing device according to any one of (1) to (7), further including at least one of a first display device that outputs the common image and a second display device that outputs the individual image for each user.

(9) The image processing device according to (7) or (8), wherein at least one of the first display device and the second display device is a projector.

(10) The image processing device according to any one of (1) to (9), wherein the determination unit determines an output protocol related to a timing for outputting the individual images in a time-division manner.

(11) The image processing device according to any one of (1) to (10), further including a communication unit for notifying a device used by each user of the output protocol.

(12) An image processing method of executing processing on content to be displayed to a plurality of users, including: a user information acquisition step of acquiring information on each user; a classification step of specifying an overlapping area in which fields of view of two or more users overlap based on the information on each user and classifying objects included in the overlapping area into a first object group and a second object group; a generation step of generating a common image common to all users, made up of the first object group and generating individual images different for each user, made up of the second object group; and a determination step of determining an output protocol for displaying the individual images.

(13) An image display system including: an image processing device that specifies an overlapping area in which fields of view of two or more users overlap based on information on each user, classifies objects included in the overlapping area into a first object group and a second object group, generates a common image common to all users, made up of the first object group, generates individual images different for each user, made up of the second object group, and notifies shutter glasses used by each user of an output protocol for displaying the individual images; a first display device that outputs the common image; a second display device that outputs the individual images of each user; and the shutter glasses used by each user.

REFERENCE SIGNS LIST

3600 Image processing device
3601 Content receiving unit
3602 User information acquisition unit
3603 View estimation unit
3604 Overlapping area determination unit
3605 Transmitting unit
3610 Content processing unit
3611 Object classification unit
3612 Common image generation unit
3613 Individual image generation unit
3614 Output protocol determination unit
3620 First projector
3630 Second projector

The invention claimed is:

1. An image processing device that executes processing on content to be displayed to a plurality of users, the device comprising:
a user information acquisition unit configured to acquire information on each user;

a classification unit configured to
specify an overlapping area in which fields of view of two or more users overlap based on the information on each user, and
classify objects included in the overlapping area into a first object group and a second object group;
a generation unit configured to
generate a common image common to all users, made up of the first object group, and
generate individual images different for each user, made up of the second object group; and
a determination unit configured to determine an output protocol for displaying the individual images; and
at least one of a first display device configured to output the common image or a second display device configured to output the individual image for each user,
wherein the user information acquisition unit, the classification unit, the generation unit, and the determination unit are each implemented via at least one processor.

2. The image processing device according to claim 1,
wherein the classification unit classifies the objects included in the overlapping area into the first object group present in a background and the second object group which is a foreground for at least some users, and
wherein the generation unit is further configured to generate a background image including the first object group as a common image and generates a foreground image for each user including the second object group as the individual image.

3. The image processing device according to claim 2,
wherein the generation unit is further configured to generate an individual foreground image in which each object included in the second object group has an effect of motion parallax for each user.

4. The image processing device according to claim 2,
wherein the generation unit is further configured to generate an individual image including an object assigned to each user in the second object group.

5. The image processing device according to claim 1,
wherein the user information acquisition unit acquires the information on each user specifying a field of view of each user.

6. The image processing device according to claim 1,
wherein the user information acquisition unit acquires the information on each user including a position and a line of sight of each user, and
wherein the classification unit classifies each object based on a distance between each user and each object.

7. The image processing device according to claim 1,
wherein the common image is output to the first display device, and
wherein the individual image for each user is output to the second display device.

8. The image processing device according to claim 7,
wherein at least one of the first display device or the second display device is a projector.

9. The image processing device according to claim 1,
wherein the determination unit determines the output protocol related to based on a timing for outputting the individual images in a time-division manner.

10. The image processing device according to claim 1, further comprising:
a communication unit configured to notify a device used by each user of the output protocol,
wherein the communication unit is implemented via at least one processor.

11. An image processing method of executing processing on content to be displayed to a plurality of users, the method comprising:
acquiring information on each user;
specifying an overlapping area in which fields of view of two or more users overlap based on the information on each user and classifying objects included in the overlapping area into a first object group and a second object group;
generating a common image common to all users, made up of the first object group and generating individual images different for each user, made up of the second object group;
determining an output protocol for displaying the individual images; and
at least one of
outputting the common image via a first display device, or
outputting the individual image for each user via a second display.

12. An image display system comprising:
an image processing device that specifies an overlapping area in which fields of view of two or more users overlap based on information on each user, classifies objects included in the overlapping area into a first object group and a second object group, generates a common image common to all users, made up of the first object group, generates individual images different for each user, made up of the second object group, and notifies shutter glasses used by each user of an output protocol for displaying the individual images;
a first display device that outputs the common image;
a second display device that outputs the individual images of each user; and
the shutter glasses used by each user.

* * * * *